United States Patent
Okuma

(10) Patent No.: US 12,450,584 B2
(45) Date of Patent: Oct. 21, 2025

(54) MOBILE SALES SYSTEM AND SERVER DEVICE

(71) Applicant: Toshiba Tec Kabushiki Kaisha, Tokyo (JP)

(72) Inventor: Yumiko Okuma, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 165 days.

(21) Appl. No.: 18/157,031

(22) Filed: Jan. 19, 2023

(65) Prior Publication Data

US 2023/0281590 A1 Sep. 7, 2023

(30) Foreign Application Priority Data

Mar. 1, 2022 (JP) ................................ 2022-030799

(51) Int. Cl.
*G06Q 20/20* (2012.01)
*G06Q 20/40* (2012.01)

(52) U.S. Cl.
CPC ......... *G06Q 20/206* (2013.01); *G06Q 20/203* (2013.01); *G06Q 20/40145* (2013.01)

(58) Field of Classification Search
CPC ............... G06Q 20/206; G06Q 20/203; G06Q 20/40145
See application file for complete search history.

(56) References Cited

U.S. PATENT DOCUMENTS 10,854,033 B2  12/2020  Jafa
11,556,976 B2   1/2023  Kobayashi
11,670,141 B1*  6/2023  Zalewski ........... G06Q 30/0633
                                                 705/26.8

(Continued)

FOREIGN PATENT DOCUMENTS

CN    109658598 A  *  4/2019  ......... G07C 9/00571
JP    2003256642 A      9/2003

(Continued)

OTHER PUBLICATIONS

Japanese Office Action dated Jun. 3, 2025, mailed in counterpart Japanese Application No. 2022-030799, 12 pages.

*Primary Examiner* — A. Hunter Wilder
*Assistant Examiner* — Joseph M Mutschler
(74) *Attorney, Agent, or Firm* — Kim & Stewart LLP

(57) ABSTRACT

According to one embodiment, a mobile sales system includes a mobile sales robot and a server. The robot includes a first processor that acquires user identification information from a user, detects when an item is removed from the robot and acquires a corresponding commodity identification, and transmits the user identification information and commodity identification to the server. The server stores the user identification information and the commodity identification in correlation with each other. Each commodity identification is associated with a settlement flag indicating whether the item has been paid for. The server transmits the commodity identifications stored in correlation with the user identification information to an external device that sends the user identification information to the server when the settlement flag indicates the corresponding item has not yet been paid for and executes settlement (payment) processing using user settlement information when a request is sent from the external device.

18 Claims, 19 Drawing Sheets

(56) References Cited

U.S. PATENT DOCUMENTS

2003/0163358 A1    8/2003  Omori
2018/0315035 A1*  11/2018  Johnson .............. H04L 67/1051
2021/0374707 A1*  12/2021  Sartori ................. G06Q 20/204

FOREIGN PATENT DOCUMENTS

| JP | 2008087892 A | 4/2008 |
| JP | 2021039620 A | 3/2021 |
| JP | 2022502765 A | 1/2022 |

\* cited by examiner

| COMMODITY CODE | COMMODITY INFORMATION | | | | | |
|---|---|---|---|---|---|---|
| | COMMODITY NAME | TYPE | PRICE | WEIGHT | IMAGE DATA | ... |

| SHELF ID | COMMODITY CODE | QUANTITY | ... |
|---|---|---|---|

| USER ID | USER INFORMATION | | |
| --- | --- | --- | --- |
| | FEATURE INFORMATION | INFORMATION FOR SETTLEMENT | ... |

| TERMINAL ID | CALL DATE AND TIME | CALL POSITION | ROBOT ID | ARRIVAL DATE AND TIME | ... |
| --- | --- | --- | --- | --- | --- |

FIG. 14

| TRANSACTION ID | USER ID | COMMODITY CODE | SETTLEMENT FLAG | ... |
|---|---|---|---|---|

3167

MOBILE SALES SYSTEM AND SERVER DEVICE

CROSS-REFERENCE TO RELATED APPLICATION

This application is based upon and claims the benefit of priority from Japanese Patent Application No. 2022-030799, filed Mar. 1, 2022, the entire contents of which are incorporated herein by reference.

FIELD

Embodiments described herein relate generally to a mobile sales system and a server device.

BACKGROUND

There has been proposed a system including a mobile robot that moves within a retail store and supports shopping of a customer in the store. The robot travels within the store and carries an item to be purchased for the customer around the store and then to a register for checkout or the like.

In this way, the system of the related art only supports the shopping of the customer inside the store. It has been desired to construct a system more useful for customers.

BRIEF DESCRIPTION OF THE DRAWINGS

FIG. 6 is a diagram illustrating an example of a data configuration of a commodity master according to an embodiment.

FIG. 7 is a diagram illustrating an example of a data configuration of a stored commodity table according to an embodiment.

FIG. 12 is a diagram illustrating an example of a data configuration of a user management table according to an embodiment.

FIG. 13 is a diagram illustrating an example of a data configuration of a call management table according to an embodiment.

FIG. 14 is a diagram illustrating an example of a data configuration of a transaction management table according to an embodiment.

DETAILED DESCRIPTION

An object of embodiments is to provide a mobile sales system and a server device for a mobile sales system by which commodities can be easily purchased.

According to one embodiment, a mobile sales system includes a mobile sales device and a server device. The server device is connected to the mobile sales device via a network. The mobile sales device includes a first processor configured to acquire user identification information from a user at the mobile sales device, detect when an item is removed from the mobile sales device and acquire commodity identification corresponding to the removed item, and transmit the user identification information and commodity identification information to the server device. The server device includes a second processor configured to store the user identification information and the commodity identification information transmitted from the mobile sales device in correlation with each other. Each piece of commodity identification information is also associated with a settlement flag value indicating whether the user has paid for the corresponding item. The second processor is configured to transmit any piece of commodity identification information stored in correlation with the user identification information to an external device that sends the user identification information to the server device when the settlement flag value associated with the piece of commodity identification information indicates the corresponding item has not yet been paid for. The second processor executes settlement processing upon a request sent from the external device. The settlement processing uses user settlement information stored in association with the user identification information included in the request sent from the external device. The settlement processing handles the payment for each item associated with a piece of commodity identification information with the settlement flag value indicating the corresponding item has not yet been paid for that is associated with the user identification information included in the request.

Certain example embodiments are explained with reference to the drawings. The present disclosure is not limited to the specific examples explained below.

Figure 1:
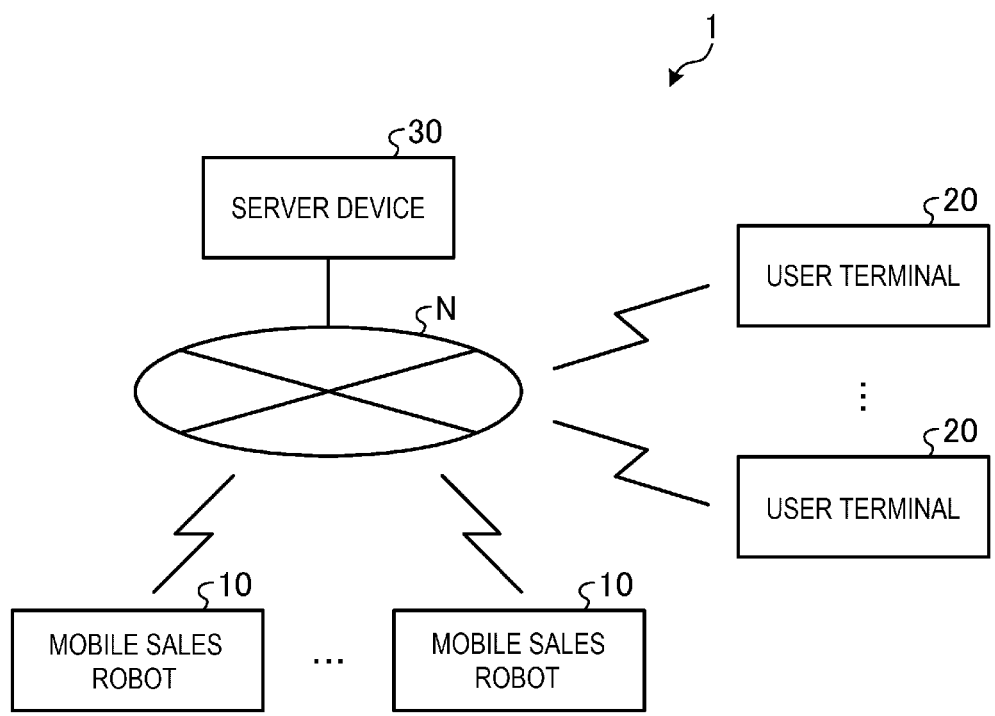
FIG. 1 is a diagram illustrating an example of a mobile sales system according to an embodiment.

FIG. 1 is a diagram illustrating an example of a configuration of a mobile sales system according to the embodiment. As illustrated in FIG. 1, a mobile sales system 1 includes mobile sales robots 10, user terminals 20, and a server device 30. The mobile sales robots 10, the user terminals 20, and the server device 30 are connected to a network N such as a LAN (Local Area Network).

Each of the mobile sales robots 10 is a self-propelled sales device that transports and sells commodities in an automated manner. The mobile sales robot 10 is an example of a mobile sales device. For example, the mobile sales robot 10 travels within a predetermined range or area such as a shopping mall or the like and sells commodities at various positions within the traveling range/area. The mobile sales robot 10 may perform patrol traveling (circuit traveling) along a predetermined route and/or call (on-demand) traveling involving traveling to a call position as designated by a customer. The number of mobile sales robots 10 is not limited.

Figure 2:
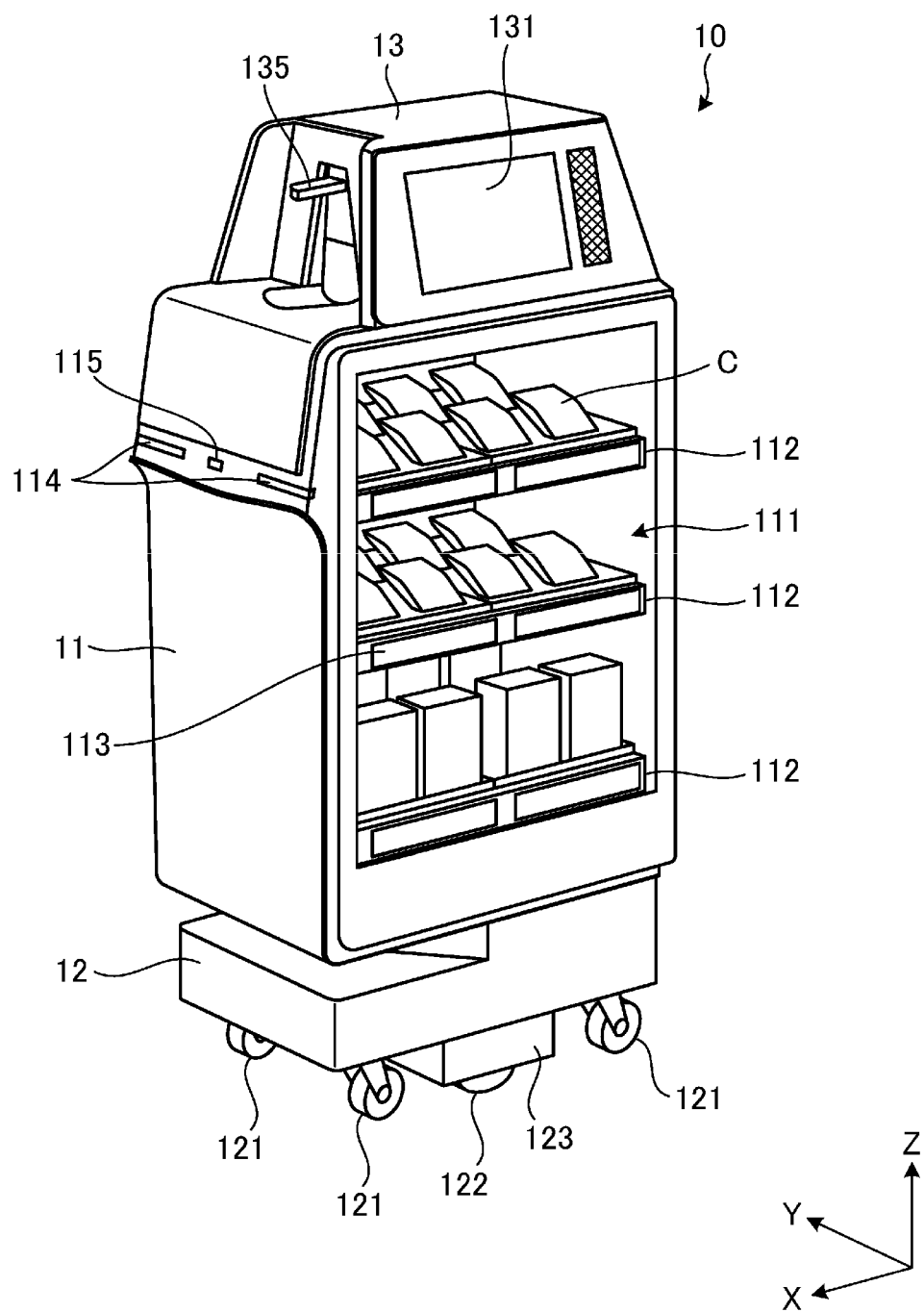
FIGS. 2 to 4 are perspective views illustrating an example of an exterior configuration of a mobile sales device according to an embodiment.
Figure 3:
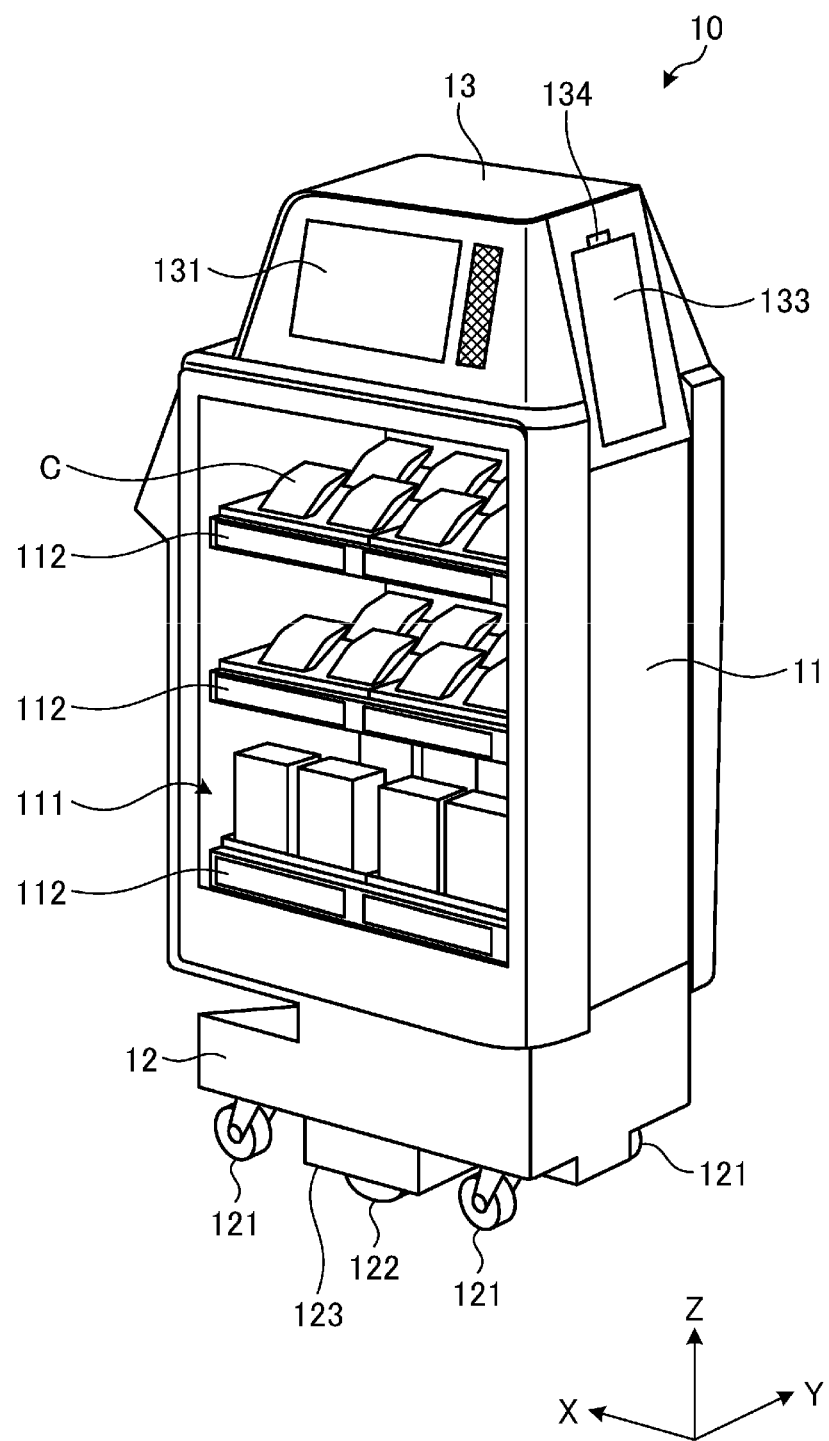
Figure 4:
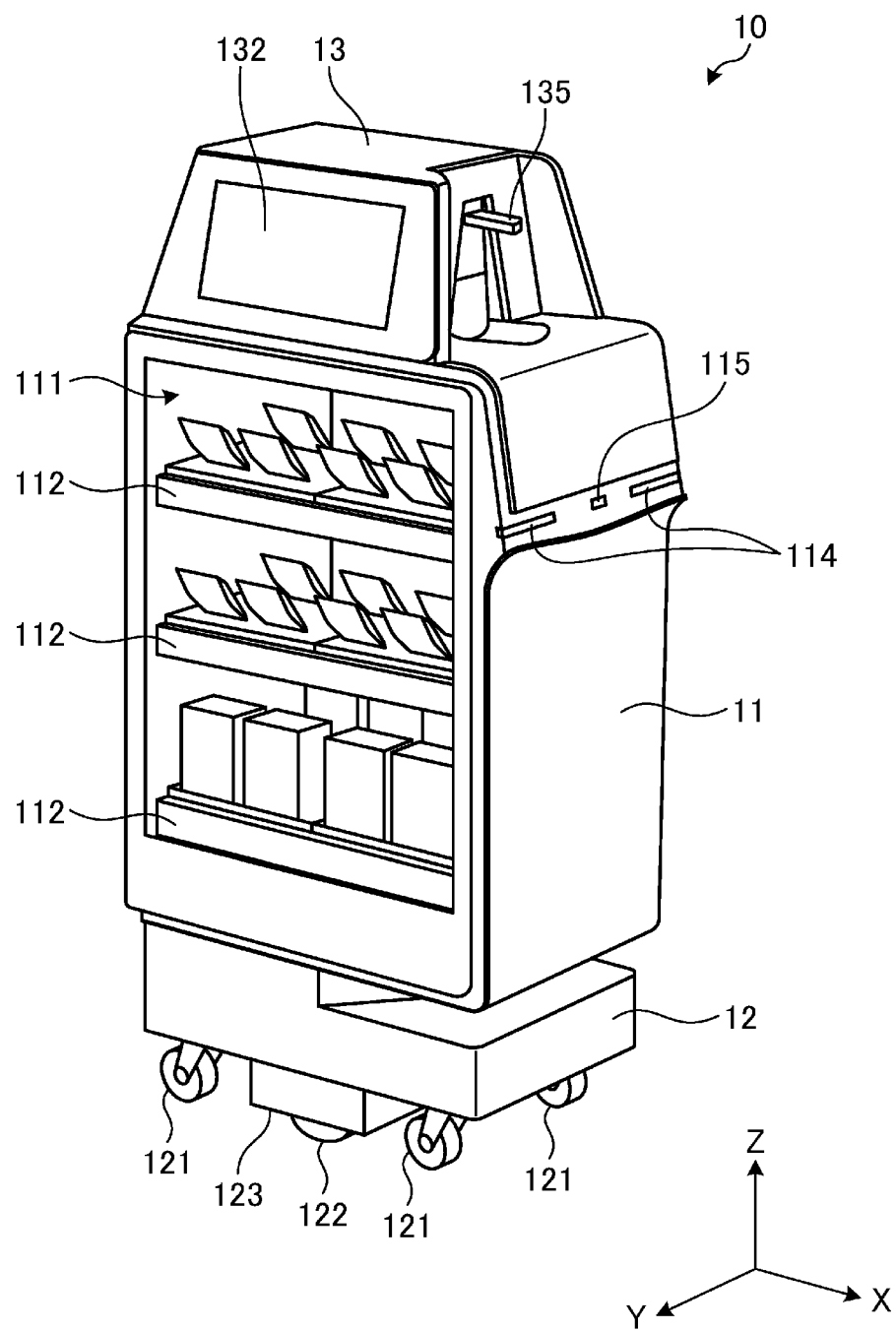

An exterior configuration of the mobile sales robot 10 is explained with reference to FIGS. 2 to 4. FIGS. 2 to 4 are perspective views illustrating an example of the exterior configuration of the mobile sales robot 10.

A configuration of the mobile sales robot 10 is explained using three axial directions of an X axis, a Y axis, and a Z axis orthogonal to one another. In the following explanation, the left side (a Y-axis negative direction side) of the mobile sales robot 10 is referred to as front side of the mobile sales robot 10. The right side (a Y-axis positive direction side) of the mobile sales robot 10 is referred to as rear side of the mobile sales robot 10.

The mobile sales robot 10 includes a main body unit 11, a moving unit 12, and a user interface unit 13. The main body unit 11 is formed by a box-like housing open on the front and rear sides. A storing unit 111 is provided on the inside of the main body unit 11.

The storing unit 111 is a space for storing commodities C to be sold such as foods and is a part of a loading unit. Shelves 112 on which the commodities C can be displayed are disposed in the storing unit 111 in multiple stages vertically in the front-rear direction of the mobile sales robot 10. The commodities C are placed on the shelves 112 by a store clerk or the like who manages the mobile sales robot 10. The commodities C stored in the storing unit 111 are not limited to food items and may be commodities of other types such as medicines or leisure goods. The storing unit 111 may store the commodities C of a plurality of types.

The shelves 112 may be divided into a plurality of regions, for example, in order to classify and place the commodities C of the same types in the same regions. In this case, the shelves 112 may be divided into a plurality of regions by using, for example, trays.

On the front side of the shelves 112, shelf labels 113 for displaying names and prices of the commodities C are provided. The shelf labels 113 may be electronic shelf labels or digital signages for digitally displaying information. In each of the shelves 112, a weight detecting unit 159 (see FIG. 5) capable of detecting the weight of the commodities C placed on the shelf 112 is provided. The weight detecting unit 159 is a detecting unit for detecting a weight change to thereby detect when a commodity is removed from the shelf 112 or returned to the shelf 112.

In this embodiment, the shelf labels 113 are provided on the front side of the shelves 112. However, the shelf labels 113 may be provided on the rear side of the shelves 112. In this embodiment, both of the front side and the rear side of the main body unit 11 (the storing unit 111) are open. However, in some examples, just one side (for example, the front side) may be open.

A door formed by a light transmissive member such as glass may be attached on one or both of the front side and the rear side of the main body unit 11 (the storing unit 111) to make it possible to access the inside of the storing unit 111 via the door. For example, the door may be attached to the front side of the main body unit 11 and the rear side of the main body unit 11 may be covered by a wall surface. In this case, the wall surface on the rear side may be formed using the light transmissive member such as glass. Consequently, it is possible to prevent commodities in the storing unit 111 from falling out of the storing unit 111 when the mobile sales robot 10 moves or the like.

Further, an electronic lock or the like may be provided in the door to make it possible to lock the door. Consequently, it is also possible to prevent the commodities in the storing unit 111 from being fraudulently taken out during movement/travel of the mobile sales robot 10.

A light emitting unit 114 and a distance measurement sensor 115 are provided on the front side of the main body unit 11. The light emitting unit 114 includes a light emitting element such as an LED (Light Emitting Diode) and emits light according to control of a control unit 154 to inform an operation state of the mobile sales robot 10. For example, the light emitting unit 114 emits light when the mobile sales robot 10 moves to inform people around the mobile sales robot 10 that mobile sales robot 10 is moving.

A light emission color of the light emitting unit 114 is not limited to a single color. For example, the light emitting unit 114 may vary the light emission color and change a light emission pattern according to an operation state of the mobile sales robot 10. The light emitting unit 114 may be provided on the rear side of the main body unit 11 instead of the front side of the main body unit 11 in some examples.

The distance measurement sensor 115 is a sensor device for detecting an object around the mobile sales robot 10 and detecting the distance to the object. A sensing result of the distance measurement sensor 115 is output to the control unit 154 and used to avoid collisions when moving and detect a user. The distance measurement sensor 115 can be realized by, for example, a sensor device that performs object detection and distance measurement with a captured image or ultrasound or a sensor device such as LiDAR (Light Detection and Ranging) that performs object detection with laser light.

A position where the distance measurement sensor 115 is provided is not limited to the front of the mobile sales robot 10. For example, the distance measurement sensor 115 may be provided in another position such as the rear of the mobile sales robot 10. An imaging unit 134 may be used as the distance measurement sensor 115.

The moving unit 12 is provided under the main body unit 11 and supports the main body unit 11 and permits the mobile sales robot 10 to move. Specifically, the moving unit 12 includes four non-driving wheels 121, two driving wheels 122, and a driving unit 123 that drives the driving wheels 122.

The non-driving wheels 121 are small wheels. The non-driving wheels 121 freely change a direction according to the direction of force generated by rotation of the driving wheels 122 to change a traveling direction of the mobile sales robot 10 (the moving unit 12).

The driving wheels 122 are driven to rotate by the driving unit 123 to thereby move the mobile sales robot 10 (the moving unit 12) forward and backward.

The driving unit 123 includes a driving source such as a motor or a power supply. The driving unit 123 drives to rotate the driving wheels 122 according to control of the control unit 154 to move the mobile sales robot 10 (the moving unit 12) in a direction and to a position instructed by the control unit 154.

For example, the driving unit 123 rotates or reversely rotates a pair of left and right driving wheels 122 at the same speed to move the mobile sales robot 10 forward or backward. The driving unit 123 varies rotating speeds of the pair of left and right driving wheels 122 to displace a traveling direction of the mobile sales robot 10 to the left or the right. The number of and a driving method for wheels included in the moving unit 12 are not limited.

The user interface unit 13 is provided on the main body unit 11. The user interface unit 13 includes a first display unit 131, a second display unit 132, a third display unit 133, an imaging unit 134, and a disinfection device 135.

The first display unit 131 is a display device set on the front side of the mobile sales robot 10. The second display unit 132 is a display device set on the rear side of the mobile sales robot 10. The third display unit 133 is a display device set on a backward side of the mobile sales robot 10. The first display unit 131, the second display unit 132, and the third display unit 133 displays various kinds of information relating to sales and the like of the commodities C according to the control of the control unit 154.

The imaging unit 134 is set on the backward side of the mobile sales robot 10. The imaging unit 134 is a digital camera including an imaging element such as a CCD (Charge Coupled Device) or a CMOS (Complementary MOS). The imaging unit 134 images a user using the mobile sales robot 10 to acquire a face image (facial image) of the user.

The disinfection device 135 is a device for the user using the mobile sales robot 10 to perform disinfection. In this context, disinfection means killing (removing) pathogenic bacteria, viruses, and other microorganisms present in or on a target object. The disinfection can be considered a sterile filtration, pasteurization, or sterilization.

The configuration of the disinfection device 135 does not matter in particular. For example, the disinfection device 135 may be a sprayer device that sprays a disinfection solution such as alcohol. The disinfection device 135 may be an ultraviolet disinfection device that emits an ultraviolet ray. The disinfection device 135 performs a disinfection operation such as the spray of the disinfection solution and the irradiation of the ultraviolet ray according to user operation.

An operation state of the disinfection device 135 may be electrically output to the control unit 154. In this case, for example, the user interface unit 13 or the disinfection device 135 includes a sensor device (also referred to as disinfection-operation detecting unit) that detects a disinfection operation of the disinfection device 135. Upon detecting that the disinfection operation is performed by the disinfection device 135, the disinfection-operation detecting unit outputs a detection signal to the control unit 154.

A configuration of the user interface unit 13 is not limited to an illustrated example. For example, the number and setting positions of display devices included in the user interface unit 13 are not limited to the illustrated example. The user interface unit 13 may not include the disinfection device 135. Further, the user interface unit 13 may include a reader device that reads information retained in a code symbol such as a two-dimensional code (e.g., a barcode) or a reader device that reads information from a card medium such as an IC (integrated circuit) card or a credit card.

Referring back to FIG. 1, the user terminal 20 is a device used by the user of the mobile sales system 1 and is an example of a terminal device. The user terminal 20 is realized by a portable terminal device such as a smartphone or a tablet terminal. The user terminal 20 receives a call request from a user. The call request is for requesting a mobile sales robot 10 to come to a user position. The call requests are transmitted to the server device 30. The number of user terminals 20 is not limited.

The server device 30 manages the mobile sales system 1. The server device 30 is realized by, for example, an information processing device such as a PC (Personal Computer). The server device 30 tracks commodities sold by each of the mobile sales robots 10. The server device 30 manages the mobile sales robot 10 and causes the mobile sales robot 10 to travel to a call position designated by a call request received from a user terminal 20. For example, the server device 30 tracks present positions of the mobile sales robots 10 and the user terminals 20 and, upon receiving a call request for a mobile sales robot 10 from a user terminal 20, causes the mobile sales robot 10 designated by the call request to travel toward the position of the user terminal 20.

Hardware configurations and functional aspects of devices included in the mobile sales system 1 are explained below.

Figure 5:
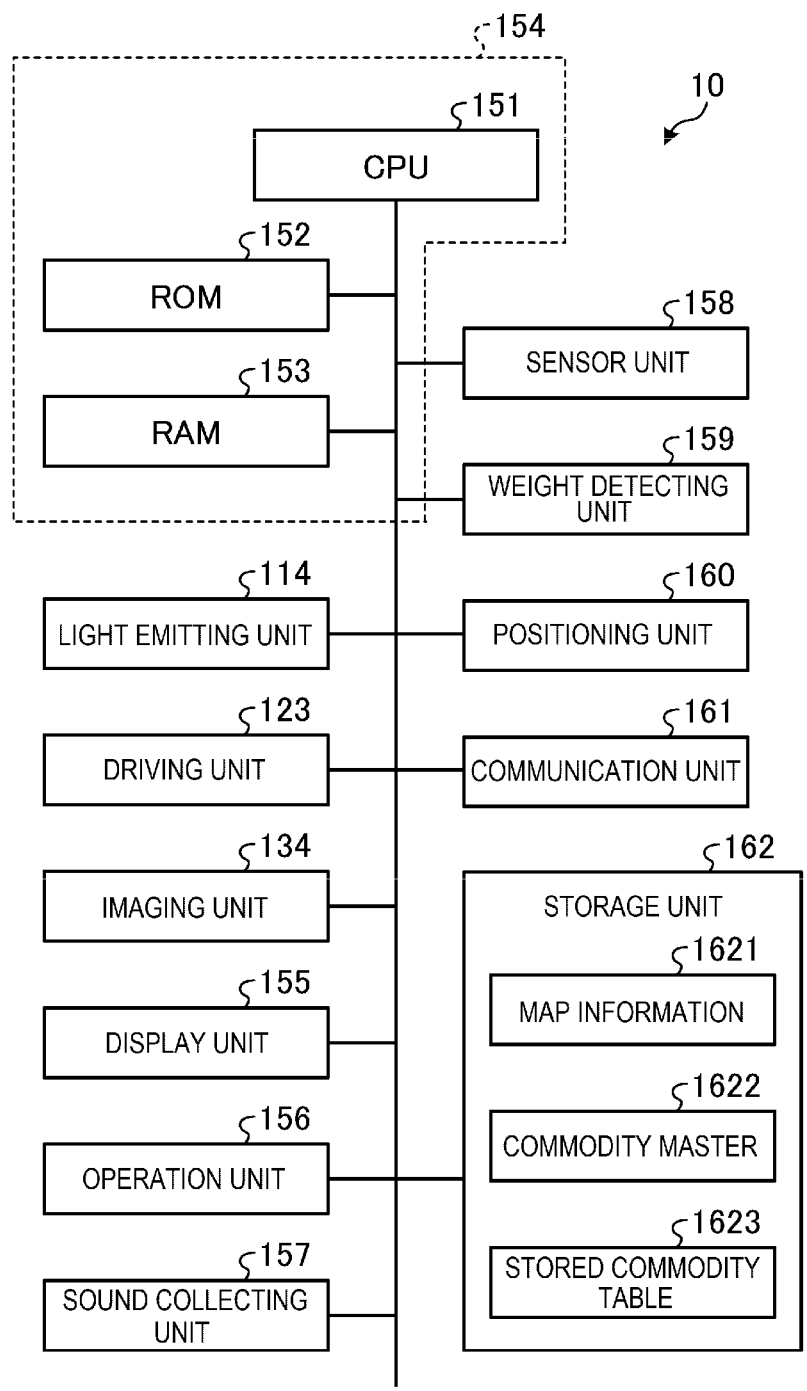
FIG. 5 is a diagram illustrating an example of a hardware configuration of a mobile sales device.

First, a hardware configuration of the mobile sales robot 10 is explained. FIG. 5 is a diagram illustrating an example of the hardware configuration of the mobile sales robot 10. As illustrated in FIG. 5, the mobile sales robot 10 includes a CPU (Central Processing Unit) 151, a ROM (Read Only Memory) 152, and a RAM (Random Access Memory) 153.

The CPU 151 is an example of a processor and collectively controls the units of the mobile sales robot 10. The ROM 152 stores various programs. The RAM 153 is a work space in which programs and various data are loaded.

The CPU 151, the ROM 152, and the RAM 153 are connected via a bus or the like and constitute the control unit 154. In the control unit 154, the CPU 151 operates according to programs stored in a storage unit 162 and loaded in the RAM 153 to thereby execute various kinds of processing.

The mobile sales robot 10 includes the light emitting unit 114, the driving unit 123, and the imaging unit 134. The mobile sales robot 10 includes a display unit 155, an operation unit 156, a sound collecting unit 157, a sensor unit 158, the weight detecting unit 159, a positioning unit 160, a communication unit 161, the storage unit 162, and the like.

The display unit 155 is a display device such as the first display unit 131, the second display unit 132, and the third display unit 133. The display unit 155 can be an LCD (Liquid Crystal Display) screen or the like. The display unit 155 displays various kinds of information under control of the CPU 151. If the shelf label 113 is an electronic shelf label, the display unit 155 may include the electronic shelf label.

The operation unit 156 is an input device such as a keyboard or a pointing device. The operation unit 156 outputs operation content received from the user to the CPU 151. The operation unit 156 may be a touch panel provided on a display screen of the display unit 155.

The sound collecting unit 157 collects sound around the mobile sales robot 10 and outputs a sound signal of the collected sound to the CPU 151. The sound collecting unit 157 is realized by a sound collecting device such as a microphone. The sound collecting unit 157 collects, for example, a voice command/request for stopping traveling from a user who desires to purchase a commodity during the patrol traveling of the mobile sales robot 10.

The sensor unit 158 is a sensor device such as the distance measurement sensor 115 or the disinfection-operation detecting unit. The sensor unit 158 outputs a detection result obtained by sensing to the CPU 151.

The weight detecting unit 159 is a weight sensor that detects the weight of commodities stored in the storing unit 111. Specifically, the weight detecting unit 159 is provided in each of the shelves 112 and detects the weight and a weight change of commodities placed on the shelf 112.

Each of the shelves 112 and the weight detecting unit 159 provided in the shelf 112 are correlated with each other in advance. If a weight change is detected by the weight detecting unit 159, it is possible to specify the shelf 112 where the change occurs.

If the shelves 112 are divided into a plurality of regions, a weight detecting unit 159 may be provided for each of the divided regions. In this case, the divided regions and the weight detecting units 159 provided for the regions are correlated.

The positioning unit 160 measures a current position of the mobile sales robot 10. The positioning unit 160 can be realized by a positioning device that uses a positioning technique such as a GPS (Global Positioning System).

The positioning unit 160 may be realized by a position measuring device that uses a positioning technique such as beacon positioning or RFID (Radio Frequency Identifier) positioning. In this case, by providing terminals adapted to the positioning technique such as the beacon positioning or the RFID positioning at several positions within a travelling range of the mobile sales robot 10, it is possible to measure (specify) a current position of the mobile sales robot 10 with a positioning system formed by the terminals and the positioning unit 160.

The communication unit 161 is a wireless communication interface connectable to the network N. The communication unit 161 performs communication with an external device such as the server device 30 via the network N.

The storage unit 162 can be a storage medium such as a HDD (Hard Disk Drive) or a flash memory and maintains stored content even if the mobile sales robot 10 is turned off. The storage unit 162 stores programs executable by the CPU 151 and various kinds of setting information.

The storage unit 162 stores map information 1621, a commodity master 1622, and a stored commodity table 1623. The map information 1621 is information indicating a map of a range in which the mobile sales robot 10 moves.

The commodity master 1622 is a data table storing information concerning sales target commodities. FIG. 6 is a diagram illustrating an example of a data configuration of the commodity master 1622. As illustrated in FIG. 6, the commodity master 1622 stores, in correlation with a commodity code for identifying a commodity, commodity information of the commodity corresponding to the commodity code. The commodity information includes, for example, a commodity name, a type, a price, a weight, and image data.

The data configuration of the commodity master 1622 is not limited to the example illustrated in FIG. 6. For example, the commodity master 1622 may store the commodity information including image data representing characteristics of the commodity.

In some examples, storage unit 162 may not store the commodity master 1622. In this case, by referring to a commodity master 3162 stored in the server device 30, the mobile sales robot 10 can treat the commodity master 3162 in the same manner as in the configuration in which the commodity master 1622 is stored.

The stored commodity table 1623 is a data table for storing information concerning the commodities stored in the storing unit 111. FIG. 7 is a diagram illustrating an example of a data configuration of the stored commodity table 1623. As illustrated in FIG. 7, the stored commodity table 1623 stores, in correlation with a shelf ID capable of identifying each of the shelves 112 provided in the storing unit 111, a commodity code of a commodity placed on the shelf 112 having the shelf ID and a quantity of the placed commodity.

The data configuration of the stored commodity table 1623 is not limited to the example illustrated in FIG. 7. For example, if the shelves 112 are divided into a plurality of regions, the stored commodity table 1623 may allocate an identifier to each of the divided regions and stores a commodity code of a commodity placed in the region and a quantity of the commodity in correlation with each other.

Figure 8:
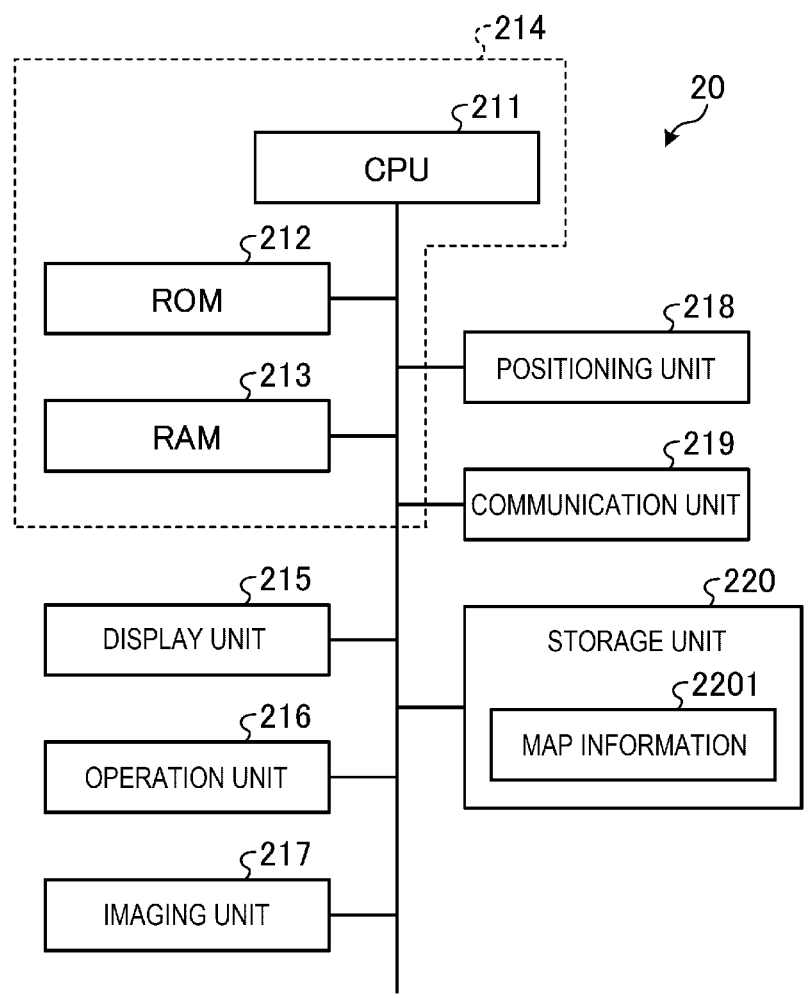
FIG. 8 is a diagram illustrating an example of a hardware configuration of a user terminal according to an embodiment.

Subsequently, a hardware configuration of the user terminal 20 is explained. FIG. 8 is a diagram illustrating an example of the hardware configuration of the user terminal 20. As illustrated in FIG. 8, the user terminal 20 includes a CPU 211, a ROM 212, and a RAM 213.

The CPU 211 is an example of a processor and collectively controls the units of the user terminal 20. The ROM 212 stores various programs. The RAM 213 is a work space in which programs and various data are loaded.

The CPU 211, the ROM 212, and the RAM 213 are connected via a bus or the like and configure a control unit 214. In the control unit 214, the CPU 211 operates according to a program stored in a storage unit 220 and loaded in the RAM 213 to thereby execute various kinds of processing.

The user terminal 20 includes a display unit 215, an operation unit 216, an imaging unit 217, a positioning unit 218, a communication unit 219, the storage unit 220, and the like.

The display unit 215 is a display device and configured by, for example, an LCD. The display unit 215 displays various kinds of information under control of the CPU 211. The operation unit 216 is an input device such as a keyboard or a pointing device. The operation unit 216 outputs operation content received from a user to the CPU 211. The operation unit 216 may be a touch panel provided on a display screen of the display unit 215.

The imaging unit 217 is a digital camera including an imaging element such as a CCD or a CMOS. The imaging unit 217 images a user using the user terminal 20 to acquire a face image or the like of the user.

The positioning unit 218 measures a position where the user terminal 20 is present. The positioning unit 218 can be realized by a positioning device that uses a positioning technique such as a GPS. Like the positioning unit 160, the positioning unit 218 may be realized by a position measuring device that uses a positioning technique such as beacon positioning or RFID positioning.

The communication unit 219 is a wireless communication interface connectable to the network N. The communication unit 219 performs communication with an external device such as the server device 30 via the network N.

The storage unit 220 includes a storage medium such as a HDD or a flash memory and maintains stored content even if the user terminal 20 is turned off. The storage unit 220 stores programs (including an application program concerning processing of the mobile sales system 1) executable by the CPU 211 and various kinds of setting information.

The storage unit 220 stores map information 2201 and the like. Like the map information 1621, the map information 2201 is information indicating the map of the range in which the mobile sales robot 10 moves.

Figure 9:
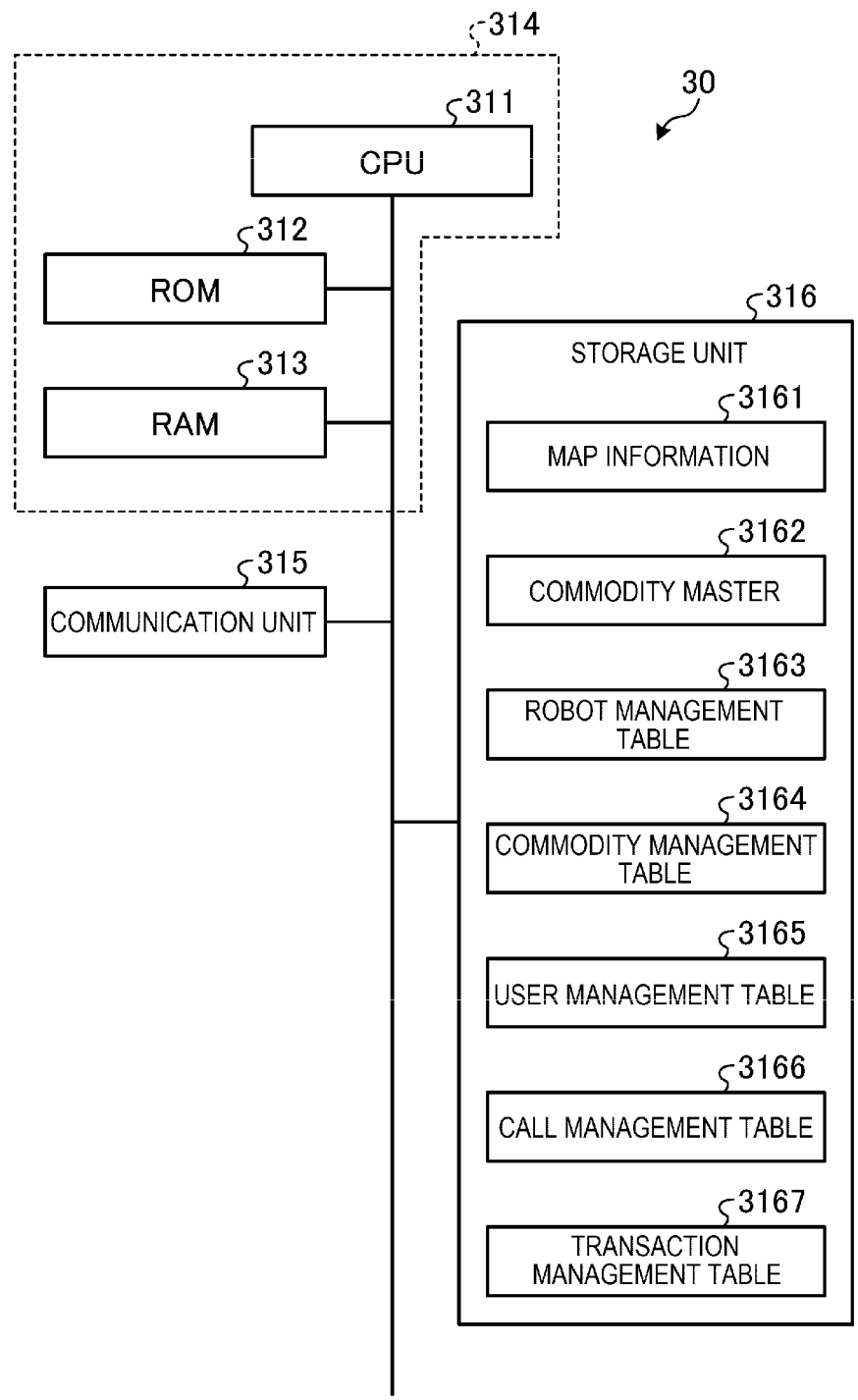
FIG. 9 is a diagram illustrating an example of a hardware configuration of a server device according to an embodiment.

Subsequently, a hardware configuration of the server device 30 is explained. FIG. 9 is a diagram illustrating an example of the hardware configuration of the server device 30. As illustrated in FIG. 9, the server device 30 includes a CPU 311, a ROM 312, and a RAM 313.

The CPU 311 is an example of a processor and collectively controls the units of the server device 30. The ROM 312 stores various programs. The RAM 313 is a work space in which programs and various data are loaded.

The CPU 311, the ROM 312, and the RAM 313 are connected via a bus and constitute a control unit 314. In the control unit 314, the CPU 311 operates according to a program stored in a storage unit 316 and loaded in the RAM 313 to thereby execute various kinds of processing.

The server device 30 includes a communication unit 315, the storage unit 316, and the like. The communication unit 315 is a wired or wireless communication interface connectable to the network N. The communication unit 315 performs communication with external devices such as the mobile sales robot 10 and the user terminal 20 via the network N.

The storage unit 316 includes a storage medium such as a HDD or a flash memory and maintains stored content even if the server device 30 is turned off. The storage unit 316 stores programs executable by the CPU 311 and various kinds of setting information.

The storage unit 316 stores map information 3161 and the commodity master 3162. The map information 3161 is information indicating the map of the range in which the mobile sales robot 10 moves. The commodity master 3162 is a data table storing information concerning sales target commodities. A data configuration of the commodity master 3162 is the same as the data configuration of the commodity master 1622.

The storage unit 316 stores a robot management table 3163, a commodity management table 3164, a user management table 3165, a call management table 3166, and a transaction management table 3167.

Figure 10:
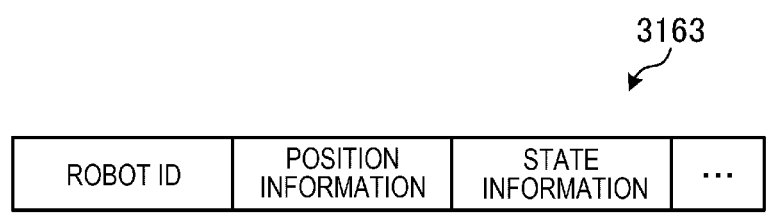
FIG. 10 is a diagram illustrating an example of a data configuration of a robot management table according to an embodiment.

The robot management table 3163 is a data table for managing a position and a state of the mobile sales robot 10. FIG. 10 is a diagram illustrating an example of a data configuration of the robot management table 3163. As illustrated in FIG. 10, the robot management table 3163 stores, in correlation with a robot ID, position information indicating a present position of the mobile sales robot 10 corresponding to the robot ID and state information indicating a state of the mobile sales robot 10. The robot ID specifies the mobile sales robot 10 and is an example of mobile sales device specifying information.

The position information may be indicated by coordinate values such as latitude and longitude. The position information may be indicated by a block number or the like if the movable range of the mobile sales robot 10 is divided into a plurality of blocks.

Examples of the state of the mobile sales robot 10 include a state of "moving" in which the mobile sales robot 10 moves to a call position designated by the user, a state of "standby for a transaction" in which the mobile sales robot 10 arrives at the call position and stays on standby for transaction start operation, and a state of "transaction" in which a transaction is started by user operation. Further, the examples of the state of the mobile sales robot 10 include a state of "standby for a call" in which the mobile sales robot 10 is capable of responding to a call from the user in, for example, a patrol time of the mobile sales robot 10, and a state of "sales unavailable" in which sales by the mobile sales robot 10 cannot be performed because of commodity supply or the like.

The information stored in the robot management table 3163 is updated by control of an information managing unit 3142 according to the movement of the mobile sales robot 10 and the state of the mobile sales robot 10.

Figure 11:
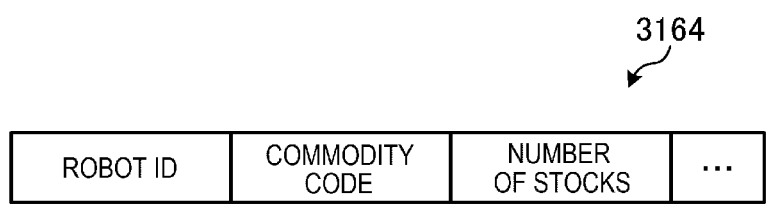
FIG. 11 is a diagram illustrating an example of a data configuration of a commodity management table according to an embodiment.

The commodity management table 3164 is a data table for managing commodities sold by each of the mobile sales robots 10. FIG. 11 is a diagram illustrating an example of a data configuration of the commodity management table 3164. As illustrated in FIG. 11, the commodity management table 3164 stores, in correlation with a robot ID, a commodity code of a commodity sold by the mobile sales robot 10 having the robot ID and the number of stocks of the commodity.

The information stored in the commodity management table 3164 is updated by the control of the information managing unit 3142 according to the number of stocks of the commodity stored by the mobile sales robot 10.

The user management table 3165 is a data table for managing a user using the mobile sales system 1. FIG. 12 is a diagram illustrating an example of a data configuration of the user management table 3165. As illustrated in FIG. 12, the user management table 3165 stores, in correlation with user IDs capable of identifying users, user information concerning the users having the user IDs.

The user information includes feature information indicating features of the faces of the users and information for settlement used for electronic settlement. The feature information is, for example, face image data obtained by imaging the faces of the users and feature values indicating the features of the faces and is used as data for collation in face authentication processing.

The information for settlement is information such as accounts for using an electronic settlement service contracted by the users in advance. The electronic settlement service includes code settlement, electronic money settlement, credit settlement, and the like. If the electronic settlement service is the credit settlement, the information for settlement may be numbers of credit cards owned by the users.

The user information can be acquired from the users by any method and registered in the user management table 3165. The user IDs may be automatically allocated or unique information input by the users may be used as the user IDs.

The user information may include other information. For example, the user information may include personal information such as names, ages, addresses of the users. The user information may include terminal IDs and communication addresses of terminals (the user terminals 20) used by the users.

The call management table 3166 is a data table for managing a call for the mobile sales robot 10 by the user terminal 20. FIG. 13 is a diagram illustrating an example of a data configuration of the call management table 3166. As illustrated in FIG. 13, the call management table 3166 stores, in correlation with one another, a terminal ID of the user terminal 20 that performs a call, a date and time when the call is received (a call date and time), position information indicating a call position (hereinafter simply referred to as "call position" as well), a robot ID of the mobile sales robot 10 that responds to the call, a date and time when the mobile sales robot 10 arrives at the call position (an arrival date and time), and the like.

The transaction management table 3167 is a data table for managing a transaction performed via the mobile sales robot 10. FIG. 14 is a diagram illustrating an example of a data configuration of the transaction management table 3167. As illustrated in FIG. 14, the transaction management table 3167 stores, in correlation with a transaction ID for identifying a transaction, a user ID of a user who performs the transaction, a commodity code of a commodity registered in the transaction, a settlement flag, and the like. The settlement flag is flag information indicating a settlement state of the transaction. In the settlement flag, for example, flag information capable of discriminating whether the settlement state is an unsettled state, a settled state, or a transaction (settlement) pending state is stored.

The transaction management table 3167 may store, in correlation with a commodity code, a robot ID of the mobile sales robot 10 in which a commodity corresponding to the commodity code is registered, that is, the mobile sales robot 10 from which the commodity is taken out. The transaction management table 3167 may store, in correlation with the commodity code, a date and time when the commodity code is stored, that is, a date and time when the commodity is registered.

Figure 15:
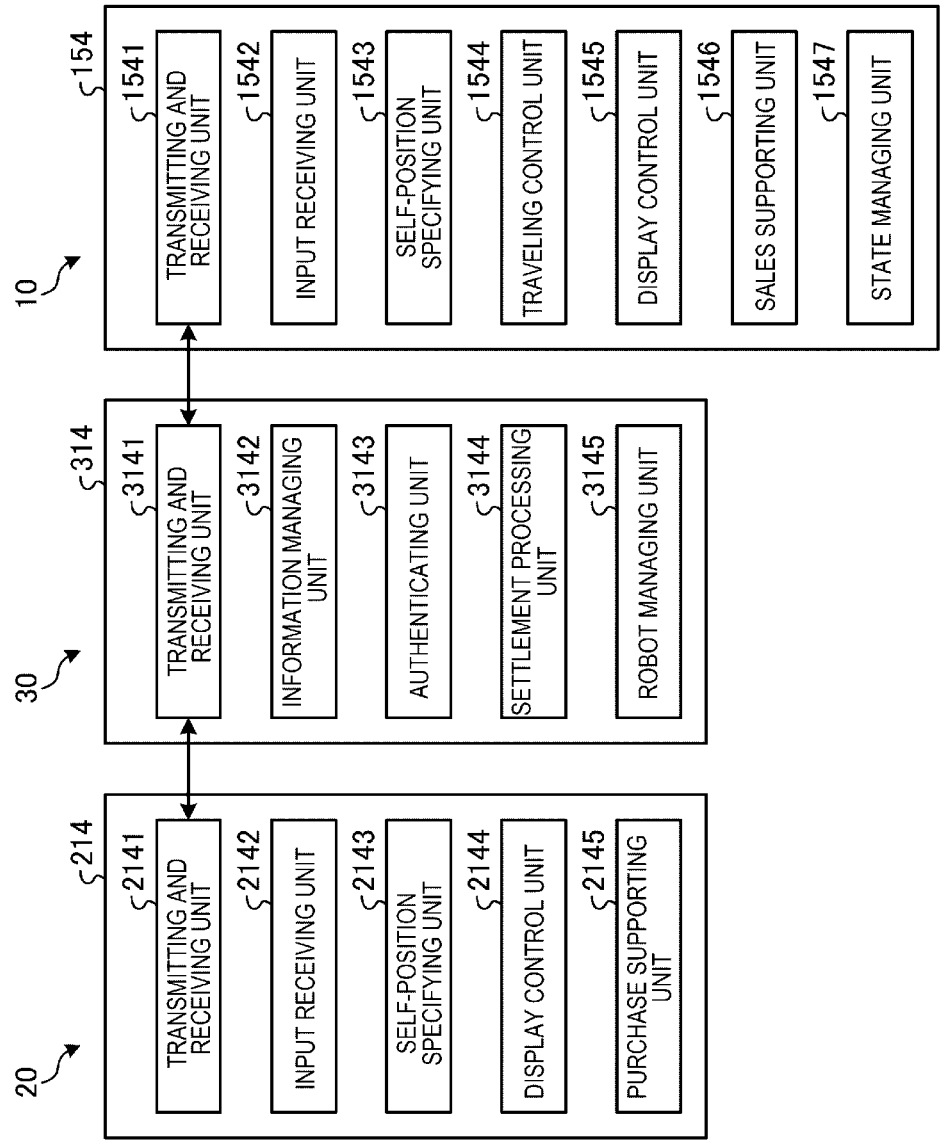
FIG. 15 is a block diagram illustrating functional aspects of devices of a mobile sales system.

Functional aspects of the devices of the mobile sales system 1 are explained. FIG. 15 is a block diagram illustrating the functional aspects of the devices of the mobile sales system 1. First, the mobile sales robot 10 is explained.

The CPU 151 operates according to a program stored in the ROM 152 or the storage unit 162, whereby the control unit 154 of the mobile sales robot 10 realizes a transmitting and receiving unit 1541, an input receiving unit 1542, a self-position specifying unit 1543, a traveling control unit 1544, a display control unit 1545, a sales supporting unit 1546, and a state managing unit 1547 as functional units. These functions may be implemented by hardware such as a dedicated circuit.

The transmitting and receiving unit 1541 transmits and receives various kinds of information to and from an external device such as the server device 30 via the communication unit 161. For example, the transmitting and receiving unit 1541 transmits position information indicating a position of the mobile sales robot 10, state information indicating the state of the mobile sales robot 10, commodity codes and the numbers of stocks of commodities stored by the mobile sales robot 10, and the like to the server device 30 at any time. The transmitting and receiving unit 1541 transmits a transaction start request, a registration request, a settlement request, a transaction suspension request, and the like to the server device 30. The transmitting and receiving unit 1541 receives a transaction ID and an existing commodity code, a settlement completion notification, a suspension completion notification, and the like from the server device 30.

The input receiving unit 1542 receives various kinds of input information via the operation unit 156 and the imaging unit 134. For example, the input receiving unit 1542 receives, via the operation unit 156, an input of information for instructing a start and pending of a transaction, and information for instructing a settlement start. The input receiving unit 1542 receives an input of feature information such as face image data of the user via the imaging unit 134.

The self-position specifying unit 1543 specifies a present position of the mobile sales robot 10 in the map information 2201 based on an output of the positioning unit 160. The self-position specifying unit 1543 transmits position information indicating the present position of the mobile sales robot 10 to the server device 30 in correlation with the robot ID.

The traveling control unit 1544 controls the driving unit 123 to control traveling of the mobile sales robot 10. For example, the mobile sales robot 10 performs, according to control of the traveling control unit 1544, patrol traveling for traveling in a predetermined route and call traveling for traveling to a call position designated by a customer.

Specifically, if the transmitting and receiving unit 1541 receives a moving instruction from the server device 30, the traveling control unit 1544 determines a moving route to the call position based on the position specified by the self-position specifying unit 1543 and the map information 1621. The traveling control unit 1544 causes, based on the determined moving route, the mobile sales robot 10 to travel to the call position. If detecting an object such as an obstacle on the moving route based on a sensing result of the distance measurement sensor 115 or the like, the traveling control unit 1544 causes the mobile sales robot 10 to travel to bypass the object.

A control method for determining the moving route and detecting and bypassing the obstacle does not particularly matter. For example, an existing car navigation technology, automatic driving technology, or the like may be used.

If it is detected that any one or all of commodities stored in the storing unit 111 are out of stock, the driving control unit 1544 moves the mobile sales robot 10 to, for example, a predetermined position of a back office to supply the commodities. If the mobile sales robot 10 travels in a shopping mall or the like, the driving control unit 1544 may move the mobile sales robot 10 to a store that sells the commodities out of stock.

The traveling control unit 1544 recognizes voice collected from the periphery by the sound collecting unit 157 and outputs a stop instruction to the driving unit 123 according to necessity. For example, if voice for stopping the mobile sales robot 10 is recognized by the voice recognition, the traveling control unit 1544 stops the mobile sales robot 10.

The display control unit 1545 controls the display unit 155 to display various kinds of information. For example, the display control unit 1545 cooperates with the sales supporting unit 1546 to cause the display unit 155 to display various screens (GUIs: Graphical User Interfaces).

The sales supporting unit 1546 is an example of the acquiring unit, the detecting unit, and the first transmitting unit. The sales supporting unit 1546 cooperates with the other functional units included in the mobile sales robot 10 and the server device 30 to execute various kinds of processing for supporting purchase of commodities sold by the mobile sales robot 10. The sales supporting unit 1546 cooperates with the display control unit 1545 to cause the display unit 155 to display various screens for supporting purchase of the commodities sold by the mobile sales robot 10.

For example, the sales supporting unit 1546 causes, according to an instruction to start a transaction, the display unit 155 to display a screen for urging a user, who performs a transaction, to capture a face image of the user. Specifically, the sales supporting unit 1546 causes any one of the first display unit 131, the second display unit 132, and the third display unit 133 to display an authentication screen for urging the user to capture a face image with the imaging unit 134.

The instruction to start a transaction is not limited to user operation via the operation unit 156. For example, the arrival of the mobile sales robot 10 at the call position may be set as a trigger to start a transaction. The capturing of the face image by the imaging unit 134 may be set as the trigger to start a transaction. The operation of the disinfection device 135 being performed may be set as the trigger to start a transaction. Predetermined voice such as voice for requesting purchase of a commodity being included in the voice collected by the sound collecting unit 157 may be set as the trigger to start a transaction. The voice being set as the trigger to start a transaction is preferably limited to when the state of the mobile sales robot 10 is the patrol traveling.

Figure 16:
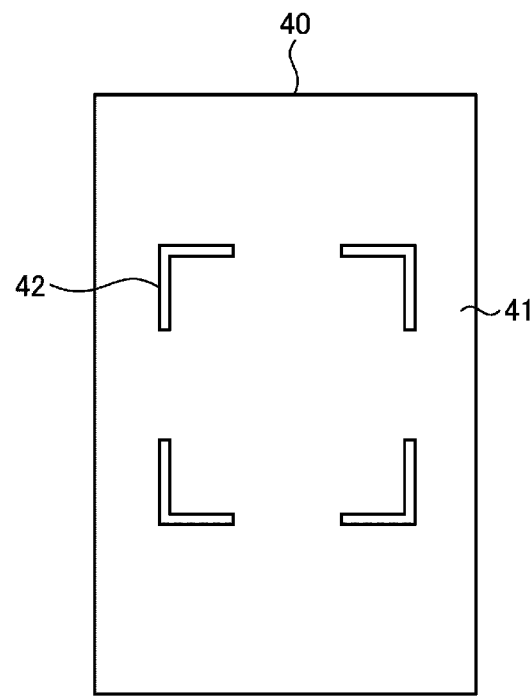
FIG. 16 is a diagram illustrating an example of an authentication screen displayed on a mobile sales robot according to an embodiment.

FIG. 16 is a diagram illustrating an example of an authentication screen displayed on the display unit 155 of the mobile sales robot 10. FIG. 16 illustrates an example of an authentication screen displayed on the third display unit 133.

As illustrated in FIG. 16, an authentication screen 40 includes an image display region 41 for displaying an image captured by the imaging unit 134. The image captured by the imaging unit 134 is displayed in the image display region 41 in real time. A photographing frame 42 is superimposed and displayed on the image display region 41. The photographing frame 42 is a frame for instructing a region where the face of a user is located within a range imaged by the imaging unit 134. A user using the mobile sales robot 10 adjusts the position of the face such that the position of the face of the user imaged on the authentication screen 40 is fit inside the photographing frame 42.

If the face is fit inside the photographing frame 42, the sales supporting unit 1546 acquires, as face image data, the image captured by the imaging unit 134 and transmits a transaction start request including the face image data to the server device 30. The server device 30, which receives the transaction start request, transmits a transaction start notification including a transaction ID to the mobile sales robot 10.

If the transmitting and receiving unit 1541 receives the transaction start notification from the server device 30, the sales supporting unit 1546 stores the transaction ID included in the transaction start notification in the RAM 153 and starts a transaction relating to the transaction ID. Specifically, the sales supporting unit 1546 brings the mobile sales robot 10 including the sales supporting unit 1546 into a state in which the mobile sales robot 10 is capable of performing commodity registration and settlement. If a transaction start notification including a commodity code is transmitted from the server device 30 according to the transmission of the transaction start request, the sales supporting unit 1546 stores the commodity code in the RAM 153 as an existing commodity code together with the transaction ID.

In this context, the existing commodity code is a commodity code of an unsettled commodity among commodities taken out from the other mobile sales robots 10 by the user.

After starting the transaction, if detecting a weight change of the shelve 112 via the weight detecting unit 159, the sales supporting unit 1546 reads out, from the stored commodity table 1623, a commodity code corresponding to a shelf ID of the shelf 112 where the weight change occurs and specifies a commodity taken out from the shelf 112 or a commodity returned to the shelf 112.

For example, if the weight change is a decrease in weight, the sales supporting unit 1546 reads out commodity codes stored in correlation with the shelf ID of the shelf 112 where the weight change occurs. The sales supporting unit 1546 refers to the commodity master 1622 and specifies a commodity code corresponding to a decreased weight among weights correlated with the read-out commodity codes to specify the commodity taken out from the shelf 112. In this case, the sales supporting unit 1546 reads out the specified commodity code from the commodity master 1622 and registers the commodity code in the RAM 153 to perform commodity registration. The sales supporting unit 1546 reduces a quantity of the specified commodity code stored in the stored commodity table 1623 by the number of articles of the commodity taken out from the shelf 112. Further, the sales supporting unit 1546 transmits a registration request including the specified commodity code and a transaction ID to the server device 30. Consequently, the server device 30 registers, based on the registration request, the commodity code designated by the registration request in correlation with the relevant transaction ID of the transaction management table 3167.

The sales supporting unit 1546 executes the processing explained above every time a commodity is taken out from the shelves 112 to sequentially register commodities taken out from the shelves 112. In the following explanation, the commodity code registered by the sales supporting unit 1546 of the mobile sales robot 10 being used by the user is referred to as a new commodity code. That is, all commodity codes registered by the mobile sales robot 10 being used by the user are new commodity codes.

If the weight change is an increase in weight, the sales supporting unit 1546 reads out commodity codes stored in correlation with the shelf ID of the shelf 112 where the weight change occurs. The sales supporting unit 1546 refers to the commodity master 1622 and specifies a commodity code corresponding to an increased weight among weights correlated with the read-out commodity codes to specify the commodity returned to the shelf 112. In this case, the sales supporting unit 1546 deletes the specified commodity code from new commodity codes stored in the RAM 153. The sales supporting unit 1546 increases a quantity of the specified commodity code stored in the stored commodity table 1623 by the number of articles of the commodity returned to the shelf 112. Further, the sales supporting unit 1546 transmits a cancellation request including the specified commodity code and the transaction ID to the server device 30. Consequently, the server device 30 deletes, based on the cancellation request, the commodity code designated by the registration request from the commodity codes correlated with the relevant transaction ID of the transaction management table 3167.

In this way, the mobile sales robot 10 automatically performs commodity registration or registration cancellation according to commodity take-out or commodity return from or to the storing unit 111. Consequently, the user does not need to perform an operation for reading a commodity code of an item to be purchased or for cancelling the purchase. Therefore, the user can easily perform commodity purchase.

The sales supporting unit 1546 causes, based on commodity information of a commodity corresponding to the commodity code stored in the RAM 153, the display unit 155 to display a commodity registration screen on which commodity names and the like of commodities are displayed as a list. The sales supporting unit 1546 preferably displays commodities corresponding to new commodity codes and commodities corresponding to existing commodity codes in a distinguishable state.

Figure 17:
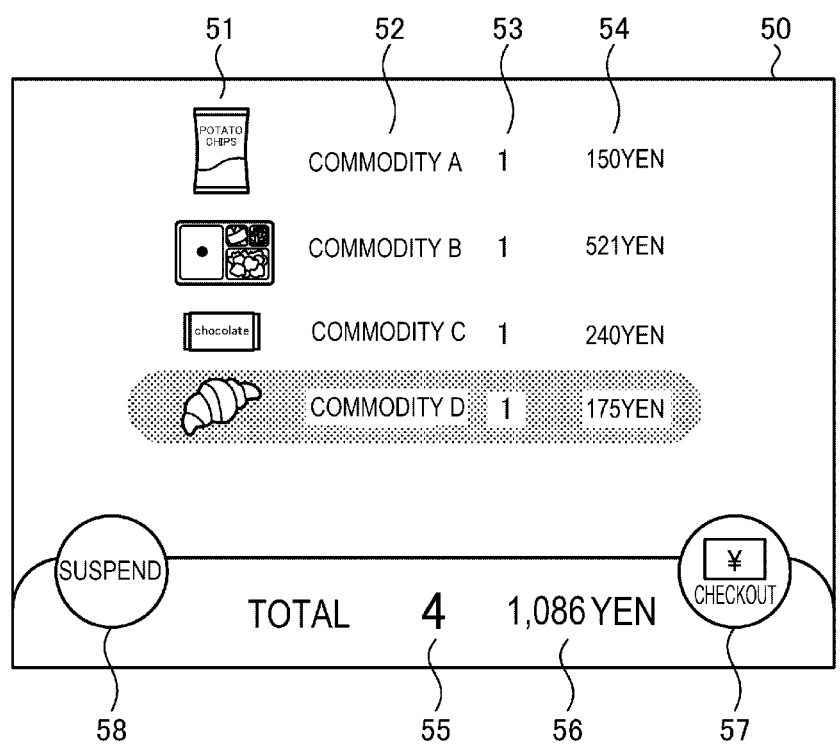
FIG. 17 is a diagram illustrating an example of a commodity registration screen displayed on a mobile sales robot according to an embodiment.

FIG. 17 is a diagram illustrating an example of a commodity registration screen displayed on the display unit 155 of the mobile sales robot 10. FIG. 17 illustrates an example of a commodity registration screen displayed on the first display unit 131.

As illustrated in FIG. 17, information concerning commodities taken out from the mobile sales robot 10 by the user is displayed on a commodity registration screen 50. Specifically, a commodity icon 51, a commodity name 52, the number of registered articles 53, and a subtotal 54 of a commodity corresponding to the commodity code stored in the RAM 153 are aligned and displayed on the commodity registration screen 50. The commodity icon 51 is an image representing the commodity. The commodity name 52 is a name of the commodity. The number of registered articles 53 indicates the number of articles of the commodity. The subtotal 54 indicates a subtotal amount of each commodity. The subtotal amount of each commodity is derived by the sales supporting unit 1546 multiplying together the number of articles of each commodity having the commodity code stored in the RAM 153 and a price of a commodity corresponding to the commodity stored in the commodity master 1622.

In FIG. 17, an example is illustrated in which, among commodity codes stored in the RAM 153, commodities responding to new commodity codes and commodities corresponding to existing commodity codes are distinguishably displayed. Specifically, in FIG. 17, a "commodity D" corresponding to a new commodity code is hatched and displayed.

The user can thus easily check, by viewing the commodity registration screen 50, the items indicated as taken out from the mobile sales robot 10 by the user. Since the user can identify at this time the items corresponding to a new commodity code and those corresponding to an existing commodity code, the user can easily confirm an item that was taken out from another mobile sales robot 10 other than the mobile sales robot 10 currently being used.

If a robot ID of the mobile sales robot 10 from which the relevant commodity is taken out and a take-out date and time are stored in correlation with the existing commodity code, the sales supporting unit 1546 may display those kinds of information in correlation with the commodity corresponding to the information.

Further, a total number of articles 55, a total amount 56, a checkout button 57, and a transaction suspension button 58 are displayed on the commodity registration screen 50. The total number of articles 55 is a total number of articles of registered commodities. The total amount 56 is a total amount of the registered commodities. The total number of articles is derived by the sales supporting unit 1546 totaling the numbers of articles of the commodity codes stored in the RAM 153. The total amount of the commodities is derived by the sales supporting unit 1546 totaling subtotal amounts of the commodities.

The checkout button 57 is an operator for instructing settlement of the commodities. The user can perform the settlement of the commodities by operating the checkout button 57.

If detecting that the checkout button 57 is operated, the sales supporting unit 1546 causes the display unit 155 to display a screen for urging the user to capture a face image. For example, the sales supporting unit 1546 causes the display unit 155 (the third display unit 133) to display the same authentication screen 40 as the authentication screen 40 illustrated in FIG. 16.

If acquiring face image data of the user, the sales supporting unit 1546 transmits a settlement request including the face image data and a transaction ID to the server device 30. The server device 30, specifies a user ID of the user corresponding to the face image data from the user management table 3165 and executes settlement processing for a commodity relating to the transaction ID designated by the settlement request using information for settlement correlated with the user ID. Upon completing the settlement processing, the server device 30 transmits a settlement completion notification to the mobile sales robot 10.

If the transmitting and receiving unit 1541 receives the settlement completion notification, the sales supporting unit 1546 causes the display unit 155 to display a screen for informing that the settlement is completed.

Consequently, the user can perform settlement for commodities taken out from one or a plurality of mobile sales robots 10 using any mobile sales robot 10. Therefore, the user can perform, in any position and at any timing, settlement of a commodity taken out from the mobile sales robot 10.

In an embodiment, the face image data of the user is acquired twice (once at the transaction start time and once at the settlement time). However, in other examples, the face image data may be acquired just once in the period from the transaction start until the settlement completion (or the transaction suspension). For example, if the face image data is acquired at the transaction start time, the face image data may be stored in the RAM 153 or the like and may be included in a transaction request and transmitted. If the face image data is acquired at another time after the transaction start, the sales supporting unit 1546 may transmit, when the settlement completion (or the settlement suspension) is designated, an authentication request including the transaction ID and the acquired face image data. The server device 30 may execute settlement processing based on an authentication result of the face image data transmitted.

The transaction suspension button 58 is an operator for instructing suspension of a transaction. By operating the transaction suspension button 58, the user can suspend a transaction presently being executed by the mobile sales robot 10.

Upon detecting that the transaction suspension button 58 has been operated, the sales supporting unit 1546 transmits a transaction suspension request including a transaction ID to the server device 30. The server device 30 updates a settlement flag of the transaction ID designated by the transaction suspension request to "pending" and transmits a suspension completion notification to the mobile sales robot 10. When the transmitting and receiving unit 2141 receives the suspension completion notification, the purchase supporting unit 2145 causes the display unit 215 to display a screen for informing the transaction has been suspended or that the state of the transaction has been changed to pending.

If the user associated with the transaction ID with a settlement flag set to "pending" accesses from the mobile sales robot 10 or the user terminal 20, the server device 30 reads out a commodity code stored in the transaction management table 3167 in correlation with the transaction ID (that is, an existing commodity code). The server device 30 transmits the read-out commodity code to the access devices (the mobile sales robot 10 or the user terminal 20) and causes the access device to resume the transaction.

Consequently, for example, if the user purchases commodities sold by other mobile sales robots 10 or if the user cannot perform settlement on site because of urgent business, the user can suspend the transaction and then resume the transaction at another time.

The instruction to suspend the transaction is not limited to the user operation via the transaction suspension button 58. For example, predetermined voice such as voice for requesting the transaction suspension being included in voice collected by the sound collecting unit 157 may be set as a trigger for the transaction start. The voice being set as the trigger for the transaction suspension is preferably limited to when the state of the mobile sales robot 10 is in transaction.

In an example, the registration request is transmitted every time a commodity is taken out. However, timing for transmitting the registration request is not limited to this. For example, the sales supporting unit 1546 may transmit a registration request including any new commodity codes registered up until that point and the transaction ID to the server device 30 at timing when the settlement instruction or the suspension instruction is performed.

Referring back to FIG. 15, the state managing unit 1547 updates, according to the state of the mobile sales robot 10, state information representing the state. For example, if the mobile sales robot 10 is moving to a call position, the state managing unit 1547 updates the state information to "moving". For example, if the mobile sales robot 10 arrives at the call position and if not receiving the instruction to start a transaction, the state managing unit 1547 updates the state information to a state of "standby for a transaction". For example, if receiving the instruction to start a transaction, the state managing unit 1547 updates the state information to "in transaction". If receiving the settlement completion notification or the suspension completion notification, the state managing unit 1547 updates the state information to "standby for a transaction".

The state information updated by the state managing unit 1547 is stored in, for example, the RAM 153 and content of the state information is notified to the server device 30 every time the state information is updated.

Functional aspects of the user terminal 20 are explained. The CPU 211 operates according to a program stored in the ROM 212 or the storage unit 220, whereby the control unit 214 of the user terminal 20 functions as the transmitting and receiving unit 2141, an input receiving unit 2142, a self-position specifying unit 2143, a display control unit 2144, and a purchase supporting unit 2145. These functions may be implemented by hardware such as a dedicated circuit.

The transmitting and receiving unit 2141 transmits and receives various kinds of information to and from an external device such as the server device 30 via the communication unit 219. For example, the transmitting and receiving unit 2141 receives a robot ID, a present position, state information, an arrival notification, and the like of the mobile sales robot 10 from the server device 30. The transmitting and receiving unit 2141 transmits a commodity information request, a call request, a login request, a settlement request, and the like to the server device 30. The transmitting and receiving unit 2141 receives unsettled commodity information, a settlement completion notification, and the like from the server device 30.

The input receiving unit 2142 receives various kinds of input information via the operation unit 216 and the imaging unit 217. For example, the input receiving unit 2142 receives an input of a commodity information request and a call request via the operation unit 216. The input receiving unit 2142 receives an input of face image data and the like of the user via the imaging unit 217.

The self-position specifying unit 2143 specifies, based on an output of the positioning unit 218, a position of the user terminal 20 in an area represented by the map information 2201.

The display control unit 2144 controls the display unit 215 to display various kinds of information. For example, the display control unit 2144 cooperates with the purchase supporting unit 2145 to cause the display unit 215 to display various screens (GUIs).

The purchase supporting unit 2145 cooperates with the other functional units included in the user terminal 20 and the server device 30 to execute various kinds of processing for supporting purchase of commodities sold by the mobile sales robot 10. The purchase supporting unit 2145 cooperates with the display control unit 2144 to cause the display unit 215 to display various screens for supporting purchase of the commodities sold by the mobile sales robot 10.

For example, the purchase supporting unit 2145 causes the display unit 215 to display a screen for supporting a call for the mobile sales robot 10. The purchase supporting unit 2145 causes the display unit 215 to display a screen for supporting settlement of commodities.

A screen example displayed by the purchase supporting unit 2145 on the display unit 215 by cooperating with the display control unit 2144 is explained below.

Figure 18:
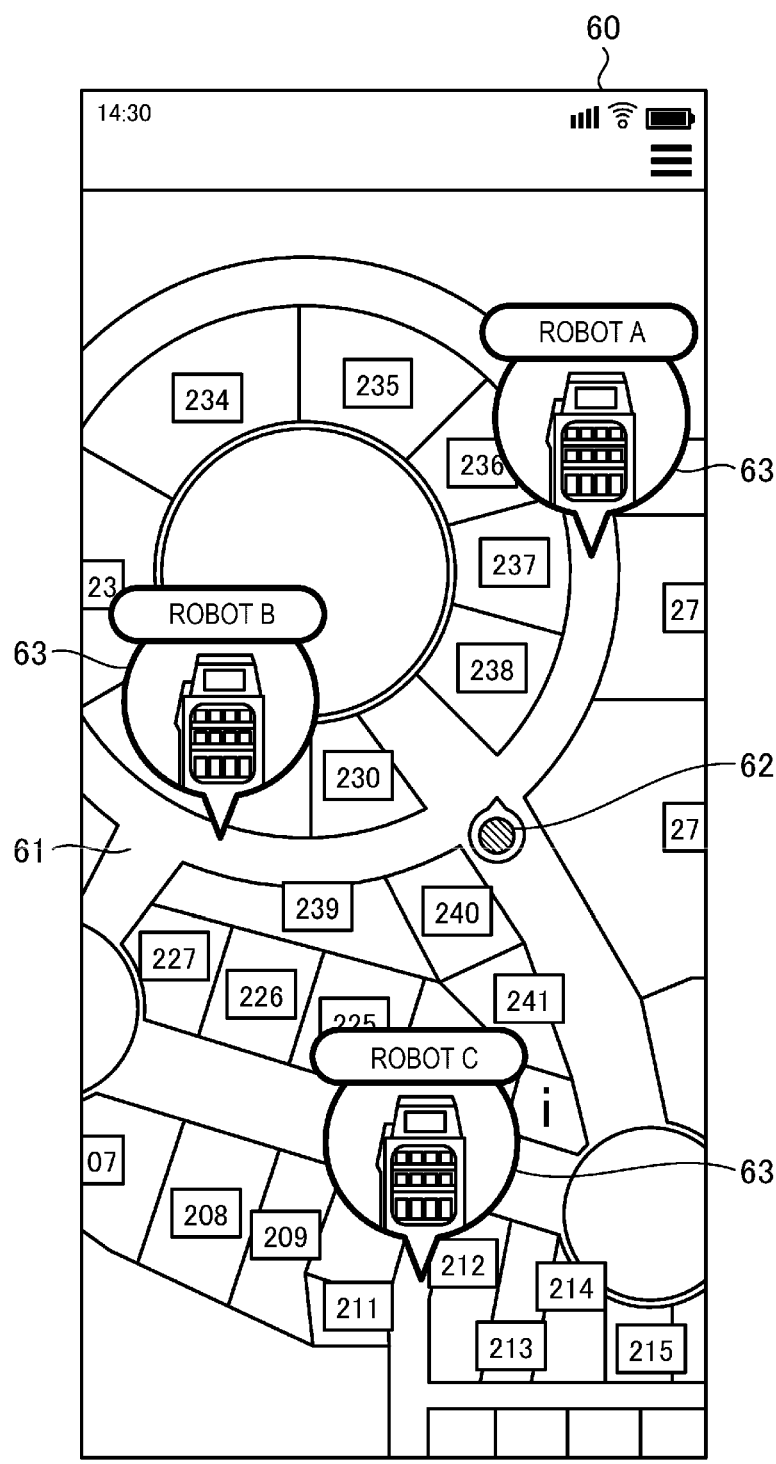
FIG. 18 is a diagram illustrating an example of a map display screen displayed on a user terminal according to an embodiment.
Figure 19:
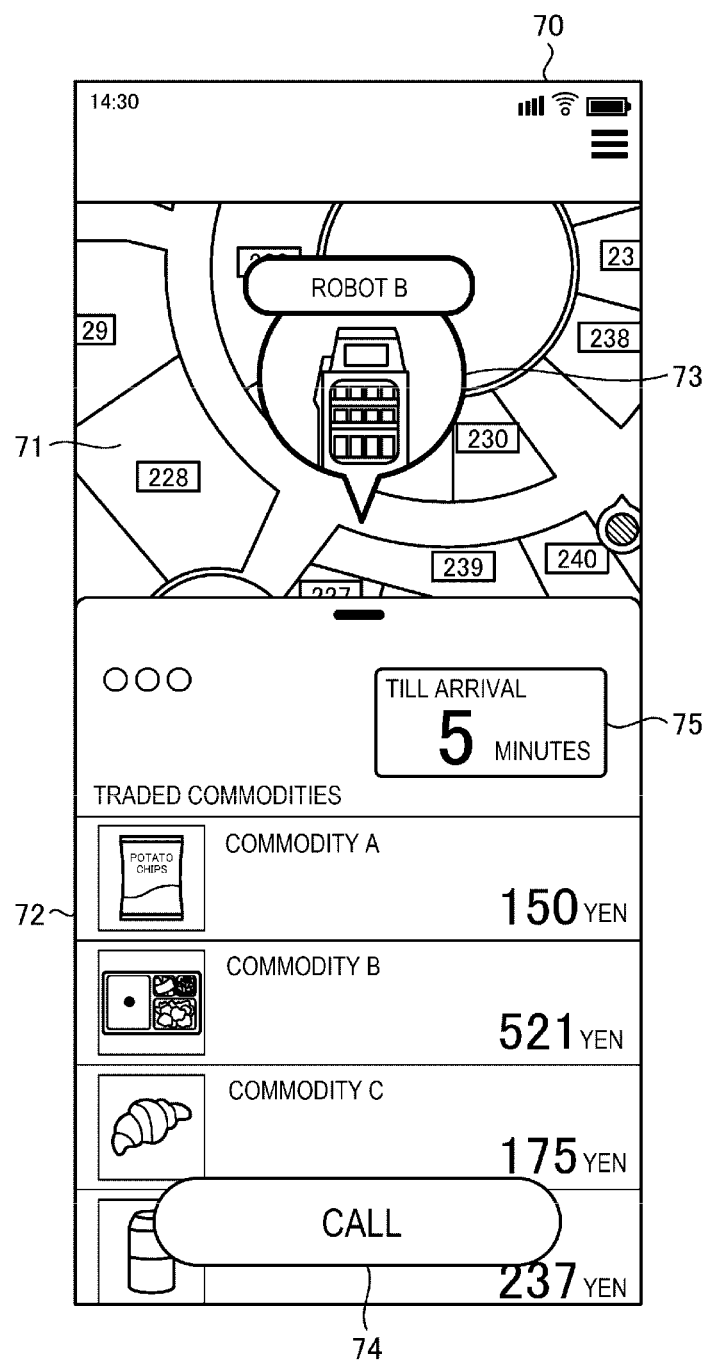
FIG. 19 is a diagram illustrating an example of a call screen displayed on a user terminal according to an embodiment.

First, a screen example supporting a call for the mobile sales robot 10 is explained with reference to FIGS. 18 and 19. FIG. 18 is a diagram illustrating an example of a map display screen displayed on the display unit 215 of the user terminal 20. FIG. 19 is a diagram illustrating an example of a call screen displayed on the display unit 215 of the user terminal 20.

If a commodity information request menu is selected from a not-illustrated menu selection screen in the user terminal 20, the purchase supporting unit 2145 causes, based on map information 2201 stored in the storage unit 220, the display unit 215 to display a map display screen 60 illustrated in FIG. 16.

The map display screen 60 includes a map display region 61. The purchase supporting unit 2145 causes, based on the map information 2201, the display unit 215 to display, in the map display region 61, a map in a range in which the mobile sales robot 10 is movable. The purchase supporting unit 2145 may cause, based on position information specified by the self-position specifying unit 2143, the display unit 215 to display a map around a position where the user terminal 20 including the purchase supporting unit 2145 is present or may cause, based on position information of the mobile sales robot 10 provided from the server device 30, the display unit 215 to display a map around a position where the mobile sales robot 10 is present. The display control unit 2144 changes, according to operation (for example, scroll operation or enlargement or reduction operation) on the map, the range of the map displayed in the map display region 61.

The purchase supporting unit 2145 causes the display unit 215 to display, in an identifiable state, the position of the user terminal 20 specified by the self-position specifying unit 2143 and the position of the mobile sales robot 10 provided from the server device 30 to superimpose the positions on the map in the map display region 61.

In FIG. 18, an example is illustrated in which the position of the user terminal 20 is represented by a hatched circular terminal mark 62. An example is illustrated in which the positions of the mobile sales robots 10 are represented by robot marks 63 simulating the mobile sales robots. Robot identification information such as robot IDs are also displayed on the robot marks 63. The robot marks 63 are displayed in a state in which the robot marks 63 are selectable by the user.

The user can select, by touching any one of the robot marks 63 displayed on the map display screen 60, the mobile sales robot 10 corresponding to the robot mark 63. If receiving selection (designation) of the mobile sales robot 10 via the input receiving unit 2142, the purchase supporting unit 2145 transmits, to the server device 30, a commodity information request including a terminal ID of the user terminal 20 including the purchase supporting unit 2145 and a robot ID of the designated mobile sales robot 10. The server device 30 reads out commodity information of commodities sold by the mobile sales robot 10 designated by the commodity information request from the commodity management table 3164 and the commodity master 3162 and transmits the commodity information to the user terminal 20.

If the transmitting and receiving unit 2141 receives the commodity information, the purchase supporting unit 2145 causes the display unit 215 to display the commodity information to be correlated with a robot mark 73 of the selected mobile sales robot 10 as shown on a call screen 70 illustrated in FIG. 19. That is, the call screen 70 is a screen which is displayed if any one of the robot marks 63 displayed on the map display screen 60 is touched.

As illustrated in FIG. 19, the call screen 70 includes a map display region 71 and a commodity information display region 72. Like the map display region 61 of the map display screen 60, the map display region 71 is a region for displaying a map based on the map information 2201. The map display region 71 is formed smaller than the map display region 61 of the map display screen 60. The purchase supporting unit 2145 causes the display unit 215 to display, in the map display region 71 of the call screen 70, the robot mark 63 touched on the map display screen 60 and a map round the robot mark 63.

The commodity information display region 72 is a region for displaying commodity information of commodities loaded on the selected mobile sales robot 10. The purchase supporting unit 2145 causes the display unit 215 to display, in the commodity information display region 72, commodity information transmitted from the server device 30 according to the selection of the mobile sales robot 10. Specifically, the purchase supporting unit 2145 causes the display unit 215 to display the commodity information to be arranged in the up-down direction for each of the commodities. The displayed commodity information is a commodity image, a commodity name, a price, and the like. The commodity information display region 72 can be scrolled in the up-down direction. The purchase supporting unit 2145 updates the displayed commodity information according to scroll operation. Consequently, commodity information of all the commodities loaded on the mobile sales robot 10 can be displayed in the commodity information display region 72.

The call screen 70 includes a call button 74 for calling the selected mobile sales robot 10. The user can check, on the call screen 70, the commodities loaded on the mobile sales robot 10 selected on the map display screen 60 and, if there is a commodity that the user desires to purchase, operate the call button 74 and call the mobile sales robot 10. By calling the mobile sales robot 10 using the map display screen 60 and the call screen 70, the user can select the call target mobile sales robot 10 while checking the position of the mobile sales robot 10. Consequently, it is possible to efficiently perform the call for the mobile sales robot 10, for example, call the mobile sales robot 10 closest to the position of the user.

Specifically, if the input receiving unit 2142 receives operation of the call button 74 on the call screen 70, the purchase supporting unit 2145 transmits, to the server device 30, a call request including the terminal ID of the user terminal 20 including the purchase supporting unit 2145, the robot ID of the selected mobile sales robot 10, and the position information (the call position) specified by the self-position specifying unit 2143. The server device 30 causes the mobile sales robot 10 having the robot ID designated by the call request to travel to the call position designated by the call request.

Consequently, after checking the commodities loaded on the mobile sales robot 10, the user is capable of calling the mobile sales robot 10. Therefore, the mobile sales system 1 can improve convenience of the user.

The server device 30 predicts, based on the present position and the call position of the robot ID designated by the call request, the number of call requests corresponding to the robot ID registered in the call management table 3166, and the like, a time until the mobile sales robot 10 corresponding to the robot ID arrives at the call position (hereinafter referred to as arrival time as well) and transmits the arrival time to the user terminal 20.

The call screen 70 includes an arrival time display region 75 for displaying a time until the selected mobile sales robot 10 arrives at the position of the user terminal 20. The purchase supporting unit 2145 causes the display unit 215 to display, in the arrival time display region 75, the arrival time transmitted from the server device 30 according to the selection of the mobile sales robot 10. The purchase supporting unit 2145 may cause the display unit 215 to display, in the arrival time display region 75, information for identifying the mobile sales robot 10 such as a robot ID of the mobile sales robot 10 scheduled to arrive.

Timing for displaying the arrival time is not limited to timing after the operation of the call button 74. For example, the purchase supporting unit 2145 may cause the display unit 215 to display the arrival time at timing when the mobile sales robot 10 is selected on the map display screen 60. In this case, by transmitting the commodity information request including the position information specified by the self-position specifying unit 2143 to the server device 30, the purchase supporting unit 2145 may acquire the arrival time from the server device 30 at the timing when the mobile sales robot 10 is selected.

The call screen 70 identifiably displays the mobile sales robot 10 selected on the map display screen 60. Specifically, in the map display region 71, the robot mark 73 added with display of "robot B" is displayed together with a map around the robot mark 73. Consequently, the user can check a position, identification information, commodity information of loaded commodities, and the like of the mobile sales robot 10 on one screen. The information for identifying the mobile sales robots 10 may be unique numbers, names, or the like set for the mobile sales robots 10.

After the transmitting and receiving unit 2141 transmits the call request, the purchase supporting unit 2145 causes, based on position information and the like of the call target mobile sales robot 10 provided from the server device 30, the display unit 215 to display a present position of the mobile sales robot 10 on the map of the map display screen 60 or the call screen 70 using the robot mark 63 or 73 or the like. Consequently, by viewing the map displayed on the map display screen 60 or the call screen 70, the user can easily check the present position of the mobile sales robot 10 selected as the call target. If the present position of the call target mobile sales robot 10 is displayed using the map display screen 60, the purchase supporting unit 2145 preferably causes the display unit 215 to display the call target mobile sales robot 10 and the other mobile sales robots 10 in an identifiable state.

Further, if the call target mobile sales robot 10 moves to the call position, the purchase supporting unit 2145 causes the display unit 215 to display a screen for informing that the mobile sales robot 10 arrives at the call position. Specifically, if detecting, based on a notice of arrival at the call position provided from the server device 30, that the call target mobile sales robot 10 arrives at the call position, the purchase supporting unit 2145 causes the display unit 215 to display a screen for informing the arrival at the call position. Consequently, by viewing the screen displayed on the display unit 215, the user can easily recognize that the mobile sales robot 10 arrives at the call position.

A method of informing the arrival of the mobile sales robot 10 is not limited to the method using the display screen. For example, the purchase supporting unit 2145 may cooperate with an informing unit such as a speaker or a vibrator included in the user terminal 20 to inform, with sound or vibration, that the mobile sales robot 10 arrives at the call position. The purchase supporting unit 2145 may cause the display unit 215 to display, on a popup screen, a robot number or a robot ID displayed on the arrived mobile sales robot 10. Consequently, the user can more easily recognize the mobile sales robot 10 called by the user. A method of displaying the robot number or the like in the mobile sales robot 10 does not matter.

In an embodiment, the arrival at the call position is informed according to the notification from the server device 30. However, in other examples, the user terminal 20 may initiate the informing of the arrival by determining whether the mobile sales robot 10 has arrived. In this case, for example, the purchase supporting unit 2145 of the user terminal 20 determines whether the position information of the call target mobile sales robot 10 provided from the server device 30 is within a predetermined range starting from position information of the call position. If the mobile sales robot 10 enters the predetermined range, the purchase supporting unit 2145 determines that the mobile sales robot 10 arrives at the call position and causes the display unit 215 to display a screen for informing that the mobile sales robot 10 arrives at the call position.

A screen for supporting the call for the mobile sales robot 10 is not limited to the example illustrated in FIGS. 18 and 19.

Figure 20:
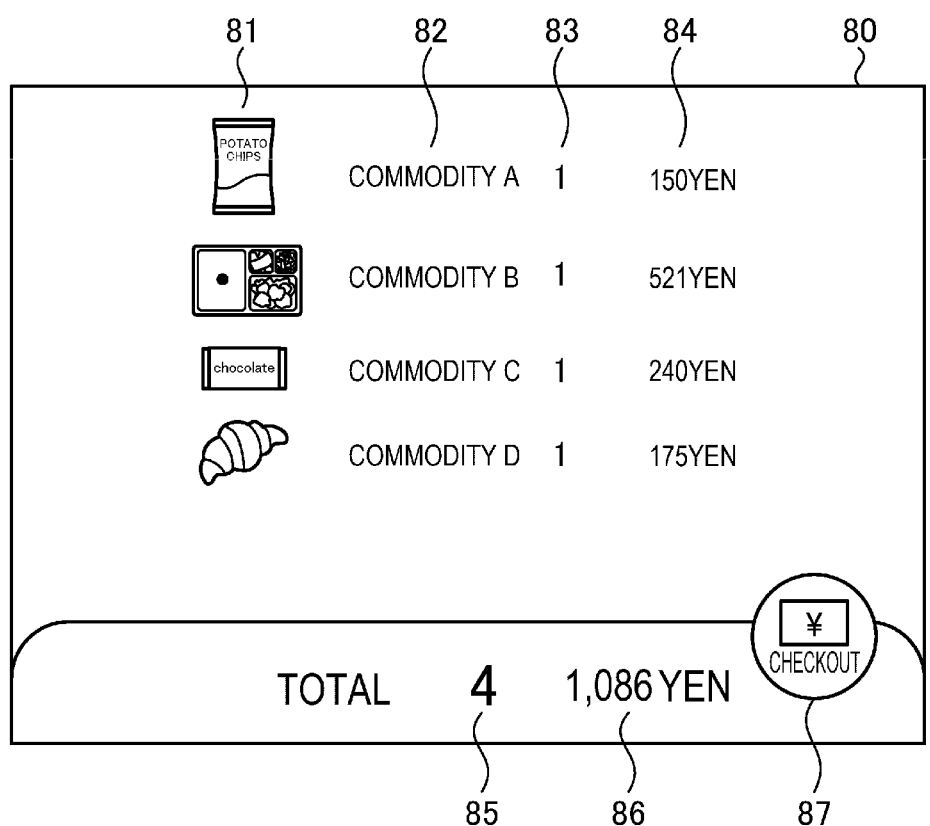
FIG. 20 is a diagram illustrating an example of a commodity check screen displayed on a user terminal according to an embodiment.

Subsequently, a screen example for supporting settlement of commodities is explained with reference to FIG. 20 and FIG. 16 referred to above. FIG. 20 is a diagram illustrating an example of a commodity check screen displayed on the display unit 215 of the user terminal 20.

If a menu for accessing the server device 30 is selected from the not-illustrated menu selection screen in the user terminal 20, the purchase supporting unit 2145 causes the display unit 215 to display an authentication screen for urging a user to input login information for logging in to the server device 30. In this embodiment, an example is explained in which face image data of the user is used as the login information. In this case, the authentication screen that the purchase supporting unit 2145 causes the display unit 215 to display may be a screen for urging the user to capture a face image of the user same as the authentication screen 40 illustrated in FIG. 16.

If the login information is input, the purchase supporting unit 2145 transmits a login request including the login information to the server device 30. The server device 30 identifies the user corresponding to the login information using the user management table 3165. The server device 30 generates unsettled commodity information of a transaction ID of a pending transaction (settlement flag is "pending"), among transactions relating to the specified user and transmits the unsettled commodity information to the user terminal 20.

When the transmitting and receiving unit 2141 receives the unsettled commodity information, the purchase supporting unit 2145 causes the display unit 215 to display the check screen illustrated in FIG. 20 including the unsettled commodity information.

Information concerning commodities for which settlement is not completed among commodities taken out from the one or the plurality of mobile sales robots 10 by the user is displayed on a check screen 80. Like the commodity registration screen 50 illustrated in FIG. 17, a commodity icon 81 representing a commodity, a commodity name 82, the number of commodity articles 83, and a subtotal 84 are displayed for each of the commodities on the check screen 80. Further, a total number of articles 85 and a total amount 86 are displayed on the check screen 80. The subtotal 84, the total number of articles 85, and the total amount 86 are included in the unsettled commodity information. However, the purchase supporting unit 2145 may derive the subtotal 84, the total number of articles 85, and the total amount 86 from content included in the unsettled commodity information.

Consequently, by viewing the check screen 80 displayed on the display unit 215, the user can easily check unsettled commodities taken out from the one or the plurality of mobile sales robots 10 by the user. If a robot ID of the mobile sales robot 10 from which commodities are taken out and a take-out date and time are stored in correlation with the commodities, the purchase supporting unit 2145 may display those kinds of information as well on the check screen 80.

A checkout button 87 is provided on the checkout screen 80. Like the checkout button 57, the checkout button 87 is an operator for instructing to perform settlement of commodities. After checking unsettled commodities from the check screen 80, the user can perform settlement of the commodities by selecting the checkout button 87.

If detecting via the input receiving unit 2142 that the checkout button 87 is operated, the purchase supporting unit 2145 causes the display unit 215 to display an authentication screen for urging the user to capture a face image. For example, the purchase supporting unit 2145 causes the display unit 215 to display the same authentication screen as the authentication screen 40 illustrated in FIG. 16. If acquiring face image data of the user, the purchase supporting unit 2145 transmits a settlement request including the face image data and a transaction ID to the server device 30. The transaction ID is provided from the server device 30 if the login request is transmitted.

The server device 30 specifies a user ID of the user corresponding to the face image data from the user management table 3165 and executes settlement processing for a commodity associated with the transaction ID designated by the settlement request. The settlement processing can use information for settlement associated with the specified user ID. Upon completing the settlement processing, the server device 30 transmits a settlement completion notification to the user terminal 20.

When the transmitting and receiving unit 2141 receives the settlement completion notification, the purchase supporting unit 2145 causes the display unit 215 to display a screen for informing that the settlement is completed.

Consequently, the user of the user terminal 20 can perform, using the user terminal 20, settlement of the commodities taken out from the one or the plurality of mobile sales robots 10 by the user. Therefore, the user of the user terminal 20 can perform, in any position and at any timing, settlement of commodities taken out from the mobile sales robot 10.

In an embodiment, the face image data of the user is acquired twice (once at the login time and once settlement time). However, in other examples, the face image data acquired at the login time may be stored in the RAM 153 or the like and then included in a settlement request and transmitted. The server device 30 may then execute the settlement processing based on an authentication result of face image data transmitted.

Referring back to FIG. 15, the functional aspects of the server device 30 are explained. The CPU 311 operates according to a program stored in the ROM 312 or the storage unit 316, whereby the control unit 314 of the server device 30 functions as a transmitting and receiving unit 3141, the information managing unit 3142, an authenticating unit 3143, a settlement processing unit 3144, and a robot managing unit 3145. These functions may be configured by hardware such as a dedicated circuit.

The transmitting and receiving unit 3141 transmits and receives various kinds of information to and from external devices such as the user terminal 20 and the mobile sales robots 10 via the communication unit 315. For example, the transmitting and receiving unit 3141 receives, from each of the mobile sales robots 10, position information and state information of the mobile sales robot 10, a commodity code and the number of stocks of commodities stored by the mobile sales robot 10, and the like. The transmitting and receiving unit 3141 receives a transaction start request, a registration request, a settlement request, a transaction suspension request, and the like from the mobile sales robot 10. The transmitting and receiving unit 3141 receives a commodity information request, a call request, a login request, a settlement request, and the like from the user terminal 20.

For example, the transmitting and receiving unit 3141 transmits a transaction ID, an existing commodity code, a settlement completion notification, a suspension completion notification, and the like to the mobile sales robot 10. The transmitting and receiving unit 3141 transmits unsettled commodity information, a settlement completion notification, and the like to the user terminal 20.

The information managing unit 3142 is an example of the information managing unit and the second transmitting unit. Based on the information received by the transmitting and receiving unit 3141, the information managing unit 3142 stores information in the storage unit 316 and updates various kinds of information stored in the storage unit 316. The information managing unit 3142 reads out, as appropriate, from the storage unit 316, various kinds of information transmitted by the transmitting and receiving unit 3141.

For example, the information managing unit 3142 updates the robot management table 3163 based on the position information and the state information received from the mobile sales robot 10 by the transmitting and receiving unit 3141.

For example, if the transmitting and receiving unit 3141 receives a commodity information request from the user terminal 20, the information managing unit 3142 reads out, from the commodity management table 3164, a commodity code corresponding to a robot ID included in the commodity information request. The information managing unit 3142 refers to the commodity master 3162 and reads out commodity information corresponding to the commodity code. The information managing unit 3142 controls the transmitting and receiving unit 3141 to transmit the read-out commodity code and the read-out commodity information to the user terminal 20.

If the transmitting and receiving unit 3141 receives a call request or an arrival notification from the mobile sales robot 10 or the user terminal 20, the information managing unit 3142 stores information in the call management table 3166 as appropriate.

For example, if the transmitting and receiving unit 3141 receives a transaction start request from the mobile sales robot 10, the information managing unit 3142 issues a transaction ID and stores the transaction ID in the transaction management table 3167 in correlation with a user ID of a user who performs a transaction (hereinafter referred to as transaction user as well). The information managing unit 3142 notifies the issued transaction ID to the mobile sales robot 10 that transmits the transaction start request. The information managing unit 3142 sets, according to the issuance of the transaction ID, a settlement flag indicating an unsettlement state in the transaction management table 3167.

The information managing unit 3142 can specify the user ID from the user management table 3165 based on face image data included in received content by cooperating with the authenticating unit 3143.

If a transaction ID with a settlement flag value indicating a "pending" state is present among transaction IDs associated with the user ID in the transaction management table 3167, the information managing unit 3142 determines that a transaction relating to the transaction ID is being resumed. In this case, the information managing unit 3142 transmits the relevant still "pending" transaction ID to the mobile sales robot 10 that sent the transaction start request. Further, if one or more commodity code is stored in correlation with the "pending" transaction ID, the information managing unit 3142 transmits the commodity code(s) to the mobile sales robot 10.

For example, if the transmitting and receiving unit 3141 receives a registration request from the mobile sales robot 10, the information managing unit 3142 stores, based on a transaction ID and a commodity code included in the registration request, the commodity code in the transaction management table 3167. Specifically, the information managing unit 3142 retrieves, from the transaction management table 3167, an entry corresponding to the transaction ID included in the commodity registration request. The information managing unit 3142 stores the commodity code included in the commodity registration request in correlation with the retrieved transaction ID to register the commodity.

If the transmitting and receiving unit 3141 receives a cancellation request from the mobile sales robot 10, the information managing unit 3142 deletes the commodity code included in the cancellation request from the transaction management table 3167. Specifically, the information managing unit 3142 retrieves, from the transaction management table 3167, an entry corresponding to the transaction ID included in the commodity registration request. The information managing unit 3142 then deletes the commodity code included in the cancellation request from the commodity codes stored in correlation with the retrieved transaction ID to cancel the previous registration of a commodity.

The information managing unit 3142 may store a robot ID of the mobile sales robot 10 that transmits the commodity registration request in correlation with the commodity code transmitted in the commodity registration request. The information managing unit 3142 may store a date and time when registration of the commodity (commodity code) is performed.

If the transmitting and receiving unit 3141 receives a transaction suspension request from the mobile sales robot 10, the information managing unit 3142 updates a settlement flag in the transaction management table 3167 for the transaction ID to the "pending" state. The information managing unit 3142 transmits, to the mobile sales robot 10, a suspension completion notification for notifying that suspension of a transaction is completed.

If the transmitting and receiving unit 3141 receives a login request from a user terminal 20, the information managing unit 3142 cooperates with the authenticating unit 3143 to find, in the user management table 3165, a user ID of a user corresponding to face image data included in the login request. The information managing unit 3142 then reads out the commodity code(s) associated with a "pending" transaction ID and the corresponding user ID. The information managing unit 3142 refers to the commodity master 3162 and reads out commodity information corresponding to the commodity code(s). The information managing unit 3142 controls the transmitting and receiving unit 3141 to generate "unsettled commodity information" including the "pending" transaction ID (settlement flag value is "pending") the commodity code(s) corresponding commodity information and transmits the unsettled commodity information to the user terminal 20.

If the user designated by the login request is absent from the user management table 3165, the information managing unit 3142 controls the transmitting and receiving unit 3141 to transmit error information (error notification) to the user terminal 20. The information managing unit 3142 may derive the number of article, a subtotal, a total number of articles, a total amount, and the like for the commodities based on the commodity code(s) correlated with the "pending" transaction ID and transmit the unsettled commodity information including the derived information.

When the transmitting and receiving unit 3141 receives a settlement request from the mobile sales robot 10 or the user terminal 20, the information managing unit 3142 cooperates with the settlement processing unit 3144 to update a settlement flag of the transaction ID to "settled" when the settlement processing is completed. The information managing unit 3142 transmits, to the mobile sales robot 10 or the user terminal 20, a settlement completion notification for notifying that the settlement has been completed.

The authenticating unit 3143 performs face authentication processing for the user based on face image data transmitted from the mobile sales robot 10 and the user terminal 20. Specifically, the authenticating unit 3143 extracts feature information indicating features of a face from the face image data transmitted from each of the mobile sales robot 10 and the user terminal 20. The authenticating unit 3143 compares the extracted feature information and feature information stored in the user management table 3165 and performs face authentication to specify a user ID of the user corresponding to the face image data. As the face authentication processing or methodology, any known technique can be used.

The settlement processing unit 3144 is an example of the settling unit. The settlement processing unit 3144 executes, based on a settlement request transmitted from the mobile sales robot 10 or the user terminal 20, settlement processing for a transaction designated by the settlement request. Specifically, the settlement processing unit 3144 cooperates with the authenticating unit 3143 to specify, from the user management table 3165, a user ID of a user corresponding to face image data included in the settlement request or the like. The settlement processing unit 3144 performs, using information for settlement stored in correlation with the specified user ID, settlement of a commodity relating to a transaction ID designed by the settlement request. More specifically, the settlement processing unit 3144 calculates, based on the commodity master 1622, a total amount of a commodity corresponding to a commodity code correlated with the transaction ID designated by the settlement request and executes settlement processing for paying the calculated total amount using the information for settlement.

For example, the settlement processing unit 3144 executes settlement by communicating with a settlement server of a settlement company. If the information for settlement indicates a prepaid amount, the settlement processing unit 3144 subtracts the total amount of the commodity from the prepaid amount to execute settlement. The settlement processing unit 3144 may perform electronic settlement with credit card settlement or two-dimensional code settlement.

The robot managing unit 3145 sets position information and state information of the mobile sales robots 10 based on call requests from the user terminals 20, and the like. For example, if the transmitting and receiving unit 3141 receives a call request from a user terminal 20, the robot managing unit 3145 sends the mobile sales robot 10 having a robot ID included in the call request and sets a call position included in the call request. For example, the robot managing unit 3145 checks state information of the mobile sales robots 10 stored in the robot management table 3163 and selects the mobile sales robot 10 corresponding to the call request out of the mobile sales robots 10 that are in a "standby for a call" state.

For call requests for which an arrival date and time is not registered in the call management table 3166, the robot managing unit 3145 sets call positions designated by the call request and causes the transmitting and receiving unit 3141 to transmit the call positions of the call requests in order of arrival (earliest call date and time first). Consequently, the robot managing unit 3145 can move the mobile sales robots 10 in a call request arrival time ordering.

The robot managing unit 3145 sets the user terminal 20 which sent the call request as a destination, then calculates an arrival time until the selected mobile sales robot 10 arrives at the call position. The arrival time is calculated based on the number of call requests (unanswered call requests for which actual arrival date and times are not registered) to the relevant mobile sales robot 10 registered in the call management table 3166, and position information and state information of the mobile sales robot 10 registered in the robot management table 3163, and the like.

The robot managing unit 3145 refers to the commodity management table 3164 and sets, as a transmission destination of a moving instruction, the mobile sales robot 10 having a robot ID, in which the number of stocks of any one or all of loaded commodities is zero, and sets, as a moving destination, a position to which the commodities are supplied.

The mobile sales robot 10 may include a part or all of the functions by the transmitting and receiving unit 3141, the information managing unit 3142, the authenticating unit 3143, the settlement processing unit 3144, and the robot managing unit 3145. In this case, the user terminal 20 transmits and receives various kinds of information to and from the mobile sales robot 10.

First, operations up until the mobile sales robot 10 called via the user terminal 20 reaches a call position is explained with reference to FIG. 21.

Figure 21:
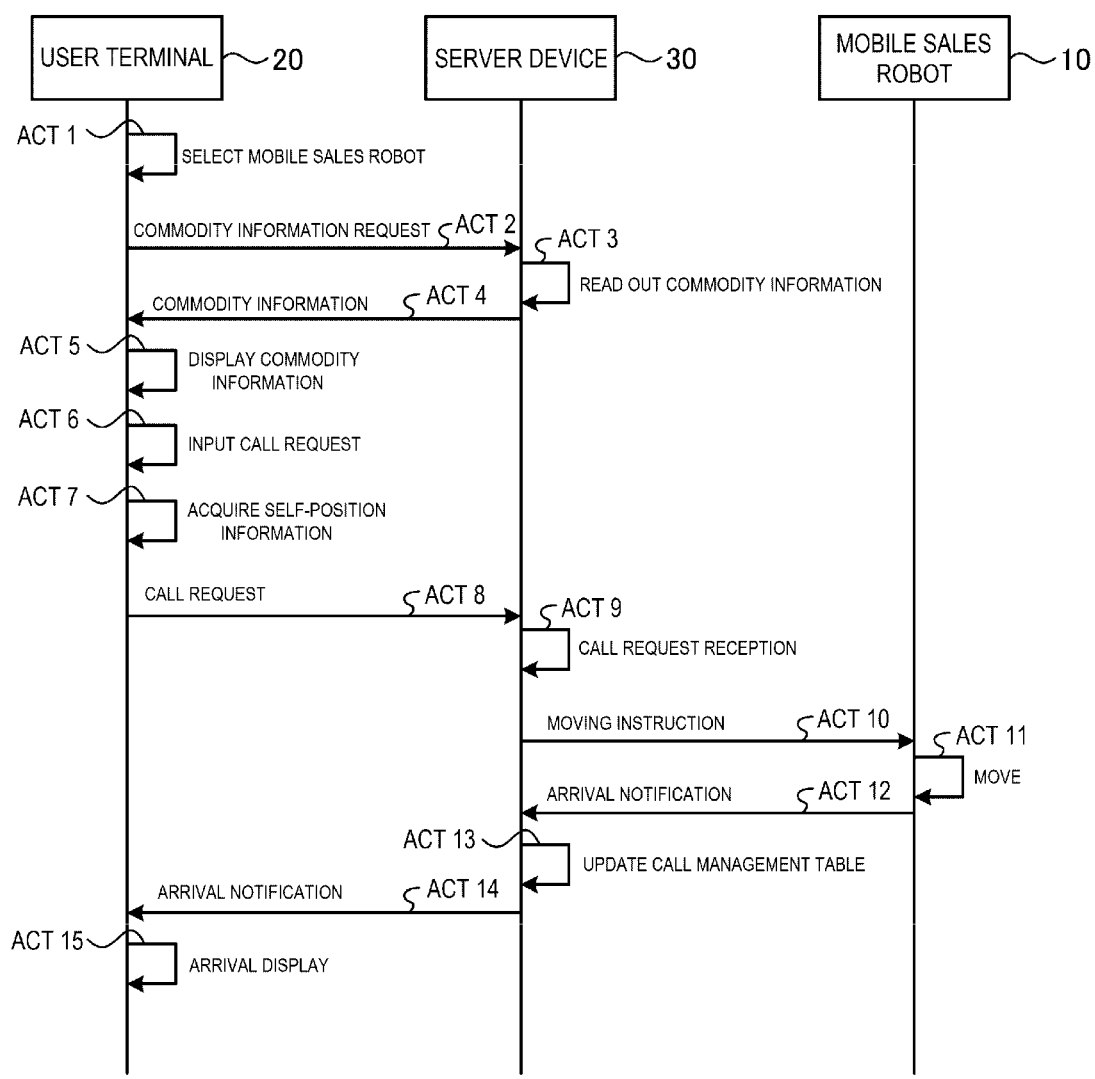
FIG. 21 is a sequence chart illustrating an example of an operation of the mobile sales system.

FIG. 21 is a sequence chart illustrating an example of the operation of the mobile sales system 1. The sequence chart illustrates a case in which a user checks commodity information of commodities loaded on the mobile sales robot 10, calls the mobile sales robot 10, and purchases the commodities of the mobile sales robot 10.

First, in calling the mobile sales robot 10, the user starts an application program of the mobile sales system 1 installed in the user terminal 20. If a commodity information request menu is selected, the user terminal 20 displays the map display screen 60 illustrated in FIG. 18 and receives selection of the mobile sales robot 10 (Act 1). The user terminal 20 transmits a commodity information request including a robot ID of the selected mobile sales robot 10 and a terminal ID of the user terminal 20 to the server device 30 (Act 2).

The server device 30 reads out commodity information from the storage unit 316 in response to the received commodity information request (Act 3). Specifically, the information managing unit 3142 reads out, from the commodity management table 3164, a commodity code corresponding to the robot ID included in the commodity information request. Subsequently, the information managing unit 3142 reads out, from the commodity master 3162, commodity information corresponding to the read-out commodity code. The information managing unit 3142 transmits the read-out commodity information to the user terminal 20 (Act 4).

The user terminal 20 displays the received commodity information on the display unit 215 (Act 5). If the user checks the displayed commodity information and there is a commodity that the user desires to purchase, the user performs operation for calling the mobile sales robot 10 loaded with the commodity. Consequently, a call request is input to the user terminal 20 (Act 6). The user terminal 20 acquires position information of a place where the user terminal 20 is present (Act 7) and transmits a call request including the acquired position information as a call position to the server device 30 (Act 8).

Upon receiving the call request (Act 9), the server device 30 transmits a moving instruction including the call position to the mobile sales robot 10 designated by the call request (Act 10).

The mobile sales robot 10 controls the driving unit 123 and moves to the call position designated by the moving instruction (Act 11). If the mobile sales robot 10 arrives at the call position, the mobile sales robot 10 transmits an arrival notification to the server device 30 (Act 12). The mobile sales robot 10 may transmit only position information indicating a presence position of the mobile sales robot 10 to the server device 30. The server device 30 may determine the arrival of the mobile sales robot 10 at the call position.

The server device 30 updates the call management table 3166 based on the received arrival notification (Act 13). Specifically, the information managing unit 3142 registers an arrival date and time of the relevant call request in the call management table 3166. Subsequently, the information managing unit 3142 transmits an arrival notification to the user terminal 20 (Act 14).

Upon receiving the arrival notification, the user terminal 20 displays, on the display unit 215, information indicating that the called mobile sales robot 10 arrives (Act 15).

The mobile sales system 1 thus makes it possible to move the mobile sales robot 10 to a call position designated by the user from the user terminal 20.

Figure 22:
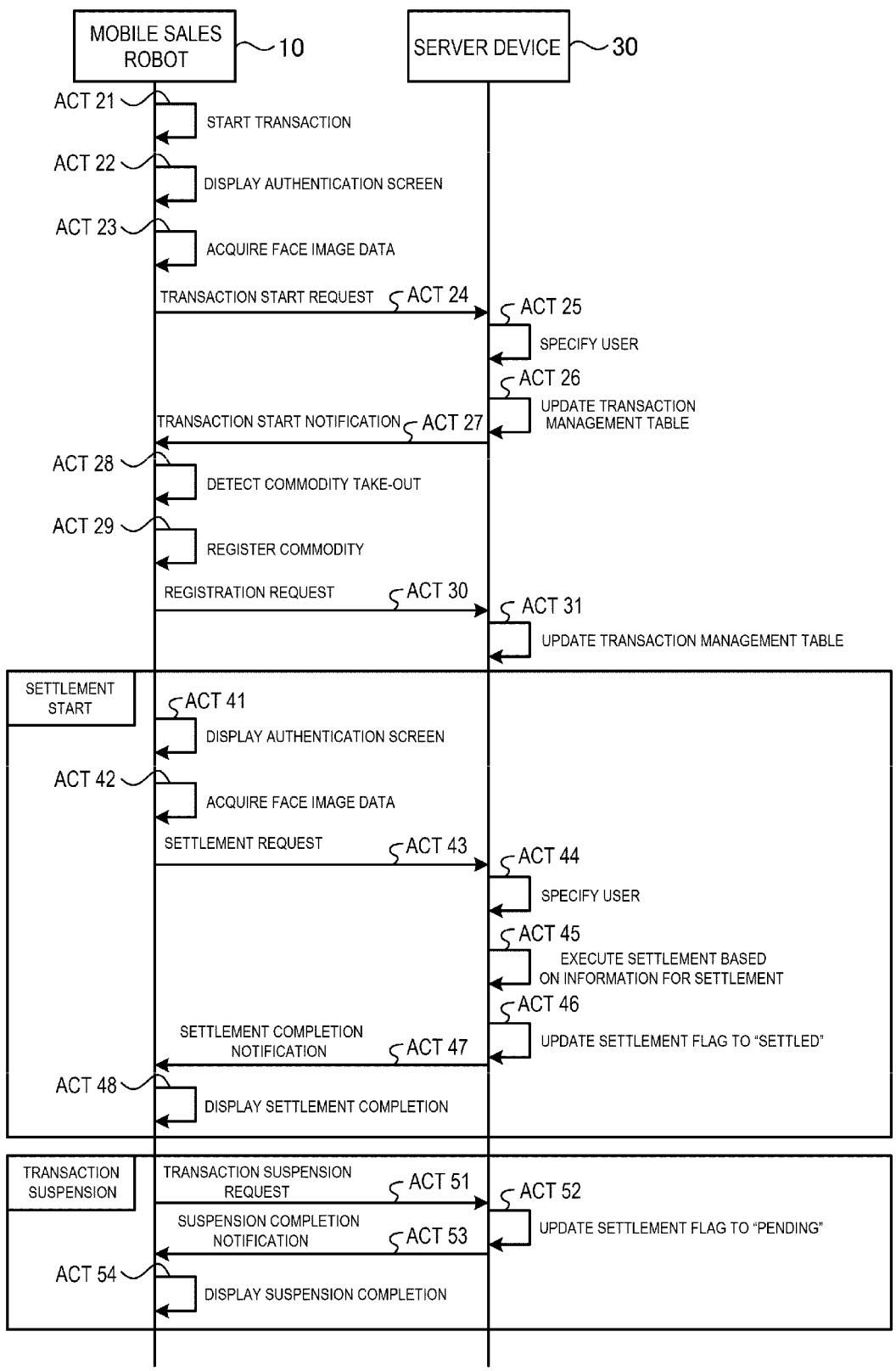
FIG. 22 is a sequence chart illustrating an example of an operation of the mobile sales system.

An operation example relating to purchase of commodities sold by the mobile sales robot 10 is explained with reference to FIG. 22. FIG. 22 is a sequence chart illustrating an example of an operation of the mobile sales system 1. The operation illustrated in FIG. 22 is executed after Act 15 in FIG. 21.

First, the user instructs the mobile sales robot 10 to start a transaction. If receiving the instruction to start a transaction (Act 21), the mobile sales robot 10 displays the authentication screen 40 illustrated in FIG. 16 and urges the user to capture a face image (Act 22). If acquiring face image data of the user who performs the transaction (Act 23), the mobile sales robot 10 transmits a transaction start request including the acquired face image data to the server device 30 (Act 24).

After receiving the transaction start request from the mobile sales robot 10, the server device 30 specifies a user ID of the user who performs the transaction (Act 25). The server device 30 issues a transaction ID and registers the transaction ID in the transaction management table 3167 in correlation with the specified user ID (Act 26). The server device 30 transmits the transaction start notification including the issued transaction ID to the mobile sales robot 10 (Act 27).

If a transaction ID relating to the user ID specified in Act 25 is already present in the transaction management table 3167 and the settlement flag associated with the transaction ID indicates "pending", the information managing unit 3142 does not issue a transaction ID anew but instead determines that the "pending" transaction is being resumed. In this case, the information managing unit 3142 transmits the transaction start notification including the relevant transaction ID (the transaction ID with a "pending" settlement flag value) and the commodity code(s) correlated with the transaction ID (that is, an existing commodity code) to the mobile sales robot 10.

After receiving the transaction start notification, the mobile sales robot 10 stores the transaction ID or the like included in the transaction start notification in the RAM 153 and permits processing relating to sales of commodities. Upon detecting that a commodity is taken out from the storing unit 111 (Act 28), the mobile sales robot 10 registers a commodity code of the commodity in the RAM 213 (Act 29). The mobile sales robot 10 transmits a registration request including the commodity code of the commodity taken out from the storing unit 111 and the transaction ID stored in the RAM 153 to the server device 30 (Act 30).

After receiving the registration request, the server device 30 registers the commodity code designated by the registration request in the transaction management table 3167 in correlation with the transaction ID designated by the registration request (Act 31). In Act 31, the server device 30 (the information managing unit 3142) may store, in correlation with the commodity code, a robot ID of the mobile sales robot 10 that transmits the registration request and a registration date and time of the commodity.

Act 28 to Act 31 are executed every time a commodity is taken out from the storing unit 111. If detecting that a commodity is returned to the shelves 112, the mobile sales robot 10 executes an operation for cancelling a registered commodity.

After receiving the transaction start notification in Act 27, the mobile sales robot 10 stands by for an input for instructing a settlement start or transaction suspension.

Upon receiving the settlement start, the mobile sales robot 10 displays the authentication screen 40 for urging the user to capture a face image (Act 41). After acquiring face image data (Act 42), the mobile sales robot 10 transmits a settlement request including the acquired face image data and a transaction ID to the server device 30 (Act 43).

Upon receiving the settlement request from the mobile sales robot 10, the server device 30 specifies, based on the face image data included in the settlement request, a user ID of the relevant user from the user management table 3165 (Act 44). The server device 30 then executes settlement for the transaction ID using settlement information correlated with the specified user ID(Act 45). After the settlement is normally completed, the server device 30 updates a settlement flag of the relevant transaction ID stored in the transaction management table 3167 to "settled" (Act 46). The server device 30 transmits a settlement completion notification to the mobile sales robot 10 (Act 47).

Upon receiving the settlement completion notification, the mobile sales robot 10 displays, on the display unit 215, information indicating that the settlement has been completed (Act 48).

After receiving the input of the transaction suspension, the mobile sales robot 10 transmits a transaction suspension request including the transaction ID to the server device 30 (Act 51).

Upon receiving the transaction suspension request from the mobile sales robot 10, the server device 30 updates, based on the transaction ID included in the transaction suspension request, a settlement flag of the relevant transaction ID stored in the transaction management table 3167 to "pending" (Act 52). The server device 30 transmits a suspension completion notification to the mobile sales robot 10 (Act 53).

After receiving the suspension completion notification, the mobile sales robot 10 displays, on the display unit 215, information indicating that the suspension of the transaction is completed (Act 54).

The mobile sales system 1 thus enables sales of commodities loaded on the mobile sales robot 10. The mobile sales system 1 enables suspension of a transaction and makes it possible to hand over the registration state of a commodity taken out from one mobile sales robot 10 to another mobile sales robot 10.

Figure 23:
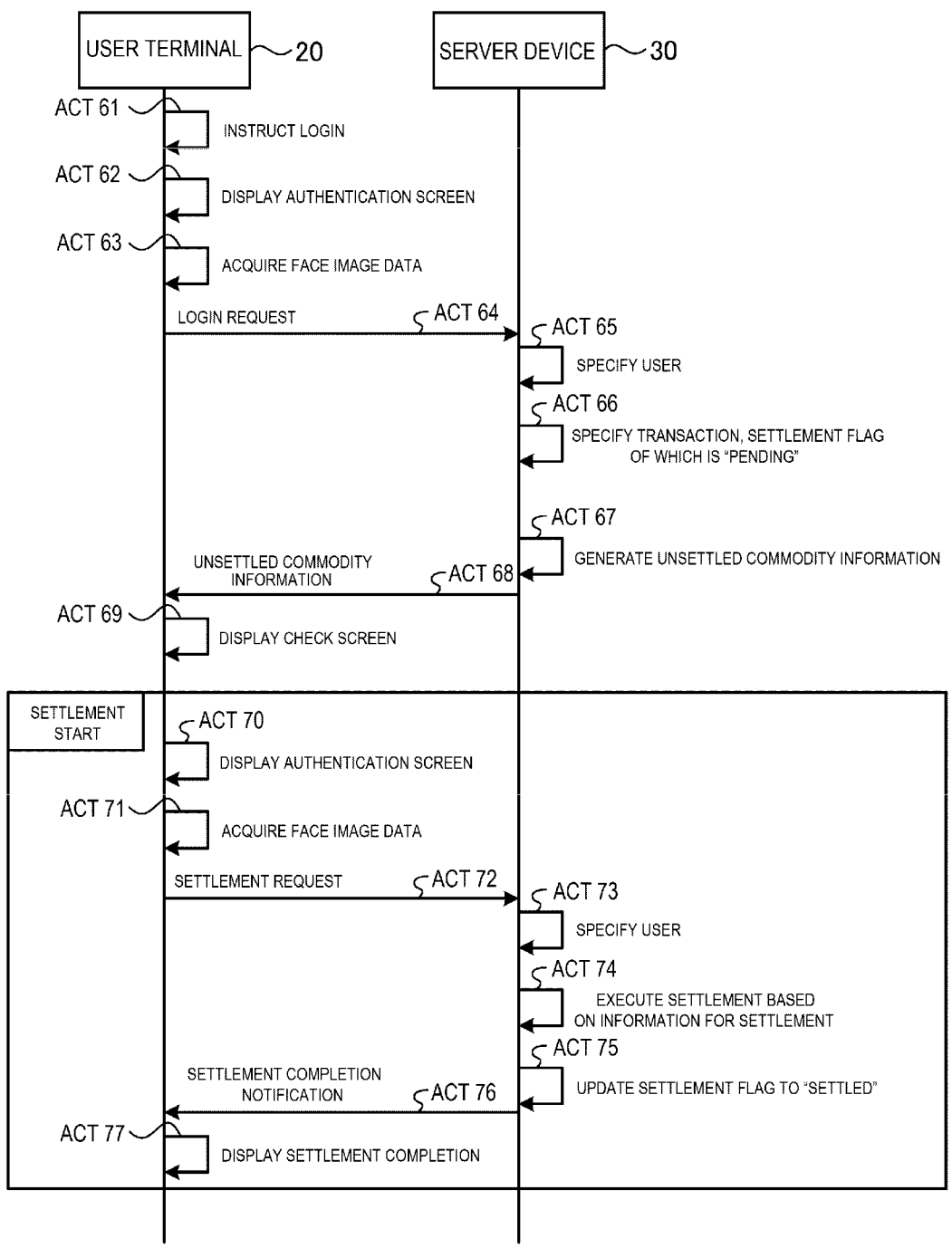
FIG. 23 is a sequence chart illustrating an example of an operation of the mobile sales system.

An operation example in which settlement of a commodity taken out from the mobile sales robot 10 is performed using the user terminal 20 is explained with reference to FIG. 23. FIG. 23 is a sequence chart illustrating an example of an operation of the mobile sales system 1. The operation illustrated in FIG. 23 is executed, for example, after Act 54 in FIG. 22.

First, in accessing the server device 30, the user starts an application program of the mobile sales system 1 installed in the user terminal 20. If login to the server device 30 is instructed (Act 61), the user terminal 20 displays an authentication screen for urging the user to capture a face image (Act 62). Upon acquiring face image data (Act 63), the user terminal 20 transmits a login request including the acquired face image data to the server device 30 (Act 64).

Upon receiving the login request from the user terminal 20, the server device 30 specifies, based on the face image data included in the login request, a user ID of the relevant user from the user management table 3165 (Act 65). Subsequently, the server device 30 specifies a transaction ID with a settlement flag indicating a "pending" state from among the transaction IDs associated with the specified user ID by reference to the transaction management table 3167 (Act 66). Subsequently, the server device 30 generates unsettled commodity information based on the transaction ID specified in Act 66 and the commodity code(s) correlated with the transaction ID (Act 67). The server device 30 transmits the generated unsettled commodity information to the user terminal 20 (Act 68).

After receiving the unsettled commodity information, the user terminal 20 causes the display unit 215 to display the check screen 80 illustrated in FIG. 20 (Act 69). The user checks the displayed check screen 80 and performs an operation for instructing a start of settlement (settlement start).

After receiving the instruction to start settlement, the user terminal 20 causes the display unit 215 to display an authentication screen for urging the user to capture a face image (Act 70). After acquiring face image data (Act 71), the user terminal 20 transmits a settlement request including the transaction ID and the acquired face image data to the server device 30 (Act 72).

Upon receiving the settlement request from the user terminal 20, the server device 30 identifies a user ID of the relevant user from the user management table 3165 based on the face image data associated with the settlement request (Act 73). The server device 30 then executes settlement of a commodity associated with the transaction ID included in the settlement request (Act 74). After the settlement is successfully completed, the server device 30 updates a settlement flag of the relevant transaction ID stored in the transaction management table 3167 to "settled" (Act 75). The server device 30 transmit a settlement completion notification to the user terminal 20 (Act 76).

Upon receiving the settlement completion notification, the user terminal 20 displays on the display unit 215 information indicating that the settlement is completed (Act 77).

The mobile sales system 1 thus makes it possible to perform settlement from the user terminal 20 for commodities taken out from the mobile sales robots 10. The user can perform settlement at a position away from the mobile sales robot 10 at any time.

The mobile sales system 1 in an embodiment includes the one or more mobile sales robots 10 loaded with commodities and the server device 30 connected to the mobile sales robots 10 via the network N. The sales supporting unit 1546 of the mobile sales robot 10 acquires face image data capable of identifying a user and detects a commodity code of a commodity taken out from the mobile sales robot 10. The sales supporting unit 1546 transmits the face image data and the commodity code to the server device 30. The information managing unit 3142 of the server device 30 stores the commodity code transmitted from the mobile sales robot 10 in correlation with the user ID associated with the face image data. The information managing unit 3142 transmits a commodity code stored in correlation with the user ID of a user corresponding to the face image data. Upon receiving a settlement request, the settlement processing unit 3144 of the server device 30 executes settlement corresponding to commodity codes stored in correlation with the user.

The mobile sales system 1 can make it possible to perform settlement for commodities taken out from the one or multiple mobile sales robots 10 using mobile sales robot 10 or the user terminal 20. Therefore, the mobile sales system 1 can make it possible to easily purchase commodities using a mobile sales robot 10.

In the mobile sales system 1, the information managing unit 3142 manages commodity codes for unsettled commodities stored in correlation with the same user ID. If execution of settlement is instructed, the settlement processing unit 3144 executes settlement for the transaction.

The mobile sales system 1 can collectively perform settlement for all commodities taken out from the one or multiple mobile sales robots 10 by the user. Therefore, even if the user takes out commodities from multiple mobile sales robots 10, the mobile sales system 1 can make it possible to easily pay for the commodities.

In the mobile sales system 1, upon receiving a transaction suspension instruction, the sales supporting unit 1546 of the mobile sales robot 10 transmits a transaction suspension request to the server device 30. The information managing unit 3142 of the server device 30 sets a state of the transaction to "pending" and, if face image data was transmitted from the mobile sales robot 10 or the user terminal 20, transmits a commodity code for a "pending" transaction of the relevant user.

Consequently, the mobile sales system 1 can make it possible to perform settlement of a commodity in a previously suspended transaction using the mobile sales robot 10 or the user terminal 20. The mobile sales system 1 can explicitly manage the transaction instructed to be suspended. Therefore, it is possible to simplify discrimination from a transaction currently being in progress and not settled.

In an embodiment, the programs executed by the mobile sales robot 10, the user terminal 20, and the server device 30 may be recorded in a computer-readable recording medium such as a CD-ROM and provided. The programs executed by the devices may be stored on a computer connected to a network such as the Internet and provided by being downloaded through the network or accessed through the network such as the Internet.

An embodiment can be modified and implemented as appropriate by changing a part of the components or the functions of the devices explained above. Therefore, in the following explanation, several modifications are presented as additional embodiments. In the following explanation, differences from the examples already explained above are mainly explained. Aspects which are the same or substantially similar to the already explained examples may not be described specifically in the following modifications. The modifications may be individually implemented or may be implemented in combination with one another as appropriate.

(Modification 1)

In an embodiment, settlement of a commodity taken out from the mobile sales robot 10 is performed according to a settlement instruction explicitly input from the user. However, a commodity settlement method is not limited to this.

For example, every time the mobile sales robot 10 detects that a commodity is removed, the mobile sales robot 10 may transmit a settlement request for the commodity to the server device 30. Specifically, every time the sales supporting unit 1546 of the mobile sales robot 10 detects that a commodity is taken out, the sales supporting unit 1546 of the mobile sales robot 10 may transmit a settlement request including a commodity ID of the taken-out commodity and a transaction ID to the server device 30. The settlement processing unit 3144 of the server device 30 specifies, based on the transaction ID included in the settlement request, a user ID stored in correlation with the transaction ID from the transaction management table 3167.

The settlement processing unit 3144 reads out information for settlement corresponding to the specified user ID from the user management table 3165 and performs, using information for settlement such as prepaid settlement, settlement of the commodity corresponding to the commodity code included in the settlement request. The information managing unit 3142 stores the commodity code, for which the settlement is completed, in the transaction management table 3167 in correlation with the transaction ID included in the settlement request.

If this modification is adopted, it is possible to discriminate whether settlement is finished for each of commodity codes by storing a settlement flag in correlation with each of the commodity codes in the transaction management table 3167. For example, if a prepaid amount is less than an amount of commodities, the settlement flag is set to an "unsettled" state. If a transaction suspension is instructed, any a commodity with an "unsettled" settlement flag is updated to "pending".

If receiving a login request from the user terminal 20, the information managing unit 3142 transmits to the user terminal unsettled commodity information generated about the commodity for which the settlement flag is "pending". If a settlement request is received from the mobile sales robot 10 or the user terminal 20, the settlement processing unit 3144 executes settlement for a commodity with an "unsettled" or "pending" settlement flag.

Consequently, every time a commodity is taken out from the mobile sales robot 10, the mobile sales system 1 can perform settlement of the commodity. If a settlement cannot be performed because of a balance shortage or the like, the mobile sales system 1 is capable of separately performing settlement via the user terminal 20 or the like. Therefore, the mobile sales system 1 can improve convenience of the user purchasing items using the mobile sales robot 10.

(Modification 2)

In an embodiment, face image data is used as user identification information for identifying (specifying) a user. However, other information may be used for identifying the user. For example, the user identification information may be a combination of a user ID and a password. In some examples, the user identification information may be biological (biometric) information other than the face image data may be used.

If this modification is adopted, the user management table 3165 stores, as feature information, the user identification information such as the set of the user ID and the password or the biological information. In the mobile sales robot 10 and the user terminal 20, an authentication screen displayed at a start time of a transaction and a start time of settlement and a login time to the server device 30 is a screen for urging the user to input the set of the user ID and the password or the biological information.

(Modification 3)

In an embodiment, the user who operates the mobile sales robot 10 when the call position is a different user than the user who called the mobile sales robot 10, commodities sold by the mobile sales robot 10 can still be purchased. However, at the transaction start time at the mobile sales robot 10, a coincidence determination for determining whether the user who operates the mobile sales robot 10 coincides with the user who called the mobile sales robot 10 may be performed and sales may be permitted to only the user who called the mobile sales robot 10.

If this modification is adopted, when a call for the mobile sales robot 10 is made, the purchase supporting unit 2145 of the user terminal 20 may acquire face image data of the calling user and transmit a call request including the face image data to the server 30. In this case, the information managing unit 3142 of the server device 30 stores the face image data included in the call request or feature information extracted from the face image data in the call management table 3166 in correlation with a robot ID of the call target mobile sales robot 10.

When the mobile sales robot 10 that arrives at the call position, the information managing unit 3142 determines whether to permit a transaction start based on a face authentication result of the face image data included in the transaction start request and feature information correlated with the relevant robot ID of the call management table 3166. Specifically, if succeeding in the face authentication, the information managing unit 3142 transmits a transaction start notification to the mobile sales robot 10. If failing in the face authentication, the information managing unit 3142 transmits error information for informing an authentication error to the mobile sales robot 10.

In the mobile sales robot 10, upon receiving the error information for informing the authentication error, the sales supporting unit 1546 displays a screen based on the error information on the display unit 155 and disapproves processing relating to commodity sales. For example, the sales supporting unit 1546 may lock the electronic lock of the door provided in the storing unit 111 to prevent commodities from being taken out.

Consequently, the mobile sales system 1 according to this modification can prevent a situation in which a user other than the user who called the mobile sales robot 10 uses the mobile sales robot 10 at the call position. Therefore, the mobile sales system 1 in this modification can improve convenience for the users who call (request) a mobile sales robot 10.

The user identification information used for the coincidence determination for the calling user is not limited to the face image data. For example, the coincidence determination for the calling user may be performed using a passcode or the like designated by the user.

The coincidence determination for the calling user may be performed using a passcode such as a one-time password instead of the face image data. In this case, the information managing unit 3142 issues a passcode and transmits the passcode to the user terminal 20 sending a call request. The information managing unit 3142 stores the issued passcode in the call management table 3166 in correlation with a robot ID of the call target mobile sales robot 10.

If a transaction start request including the passcode is transmitted from the mobile sales robot 10 that arrives at the call position, the information managing unit 3142 determines propriety of a transaction start based on an authentication (collation) result of the passcode with the relevant robot ID of the call management table 3166. In this case, the mobile sales robot 10 preferably causes the display unit 155 to display an authentication screen for urging the user to input a passcode.

(Modification 4)

In an embodiment, the unsettled transactions performed in the one or more of mobile sales robots 10 by a user (same user ID) are managed as one transaction under the same transaction ID. However, a different transaction ID may instead be issued for each of the mobile sales robots 10 and the transaction IDs may be managed in correlation with the user ID of a user who performs the transactions.

Specifically, in this modification, every time a transaction start request is received from a mobile sales robot 10, the information managing unit 3142 issues a new transaction ID and stores the transaction ID in the transaction management table 3167 in correlation with the user ID specified based on the transaction start request. The information managing unit 3142 sets the issued transaction ID as a new transaction ID and transmits a transaction notification including the new transaction ID to the mobile sales robot 10.

The information managing unit 3142 refers to the transaction management table 3167 and, if a transaction ID, with a settlement flag set to "pending" is already associated with the user ID specified in the transaction start request, the transaction ID is set as an existing ID, and a transaction start notification including the existing transaction ID together with any existing commodity codes stored in correlation with the existing transaction ID is transmitted.

Upon detecting that a commodity has been removed, the sales supporting unit 1546 of the mobile sales robot 10 registers a new commodity code based on a new transaction ID. If receiving an existing transaction ID and an existing commodity code, the sales supporting unit 1546 displays, for each existing transaction ID, a commodity corresponding to the existing commodity code in a state in which the existing commodity is distinguishable from a commodity corresponding to the new commodity code.

When a settlement start is instructed, the sales supporting unit 1546 may display a screen on which a transaction to be settled can be selected out of transactions having new transaction IDs and existing transaction IDs and transmit a settlement request for the selected transaction to the server device 30. In this case, the settlement request includes, besides the face image data, a settlement target transaction ID selected out of the new transaction IDs and the existing transaction IDs. In the server device 30, if receiving the settlement request, the settlement processing unit 3144 performs settlement of a commodity relating to the settlement target transaction ID and updates a settlement flag relating to the transaction ID to a state of "settled". The information managing unit 3142 transmits, to the mobile sales robot 10, a transaction completion notification including the transaction ID for which the settlement is completed. If receiving the transaction completion notification from the server device 30, the sales supporting unit 1546 displays, on the display unit 155, a screen for informing that the settlement for the transaction ID included in the transaction completion notification is completed.

Even if login request and a settlement request is transmitted from the user terminal 20, operations other than issuance of a transaction ID are the same as the operations performed if the transaction start request and the settlement request are transmitted from the mobile sales robot 10.

If transaction suspension is instructed, the sales supporting unit 1546 transmits a transaction suspension request to the server device 30. In this case, the sales supporting unit 1546 may transmits the transaction suspension request including the remaining transaction IDs other than the transaction ID included in the transmitted settle request among the new transaction IDs and the existing transaction IDs. Since settlement flags of the existing transaction IDs other than the new transaction IDs are maintained in the latest state, only if the new transaction IDs are in an unsettled state, the server device 30 may transmit the transaction suspension request including the new transaction IDs.

Consequently, the mobile sales system 1 according to this modification can manage a transaction on a per mobile sales robot 10 basis when the user takes out a commodity. The mobile sales system 1 according to this modification can perform settlement and suspension on a per transaction basis. Therefore, the mobile sales system 1 according to this modification can improve convenience of the user.

(Modification 5)

In an embodiment, the time period until settlement of a transaction is shifted to a state of "pending" does not particularly matter. However, for example, the user may be reminded that a pending transaction is present or an unsettled transaction is present.

In this case, if receiving the transaction suspension request, the information managing unit 3142 of the server device 30 stores date and time information indicating a date and time when the request was received in correlation with the relevant transaction ID of the transaction management table 3167. If a predetermined time elapses (for example, one hour) from the date and time information correlated with the transaction ID still in the "pending" state, the information managing unit 3142 reminds a user of the user terminal 20 that a pending transaction is present.

Consequently, if a pending transaction is present, the mobile sales system 1 according to this modification can inform a user of the relevant still pending transaction. Therefore, the mobile sales system 1 according to this modification can urge the user to resume the transaction or execute settlement. Therefore, the mobile sales system 1 can improve convenience of the user (Modification 6)

In an embodiment, the call request is transmitted to the server device 30 from a user terminal 20 carried by the user. However, the call request may be transmitted to the server device 30 from any terminal device connected to the network N, for example, a fixed terminal device set in a facility in which the mobile sales robot 10 travels. If a fixed terminal device set in the facility is used in this manner, it may be desirable to enable the user to set the call position to another location besides the specific location of the fixed terminal.

In an embodiment, the login request and the settlement request are transmitted to the server device 30 from the user terminal 20 carried by the user. However, the login request and the settlement request may be transmitted to the server device 30 from any terminal device connected to the network N, for example, a fixed terminal device set in a facility in which the mobile sales robot 10 travels.

While certain example embodiments are explained above, the present disclosure is not limited to these examples. The inventive aspects of the present disclosure can be embodied in various other forms. Various omissions, substitutions, and changes can be made without departing from the gist of the present disclosure. The described embodiments and the modifications thereof are included in the scope and gist of the present disclosure as provided in the accompanying claims and equivalents thereto.

What is claimed is:

1. A mobile sales system, comprising:
a mobile sales device; and
a server device connected to the mobile sales device via a network, wherein
the mobile sales device includes a first processor configured to:
acquire user identification information from a user at the mobile sales device for a sales transaction,
detect when an item is removed from the mobile sales device and acquire commodity identification corresponding to the removed item,
transmit the user identification information and commodity identification information to the server device,
receive a suspension request for the sales transaction for permitting a delay in payment for the removed item to a later time without return of the removed item, and
send the suspension request to the server device; and
the server device includes a second processor configured to:
store the user identification information and the commodity identification information transmitted from the mobile sales device in correlation with each other, each piece of commodity identification information also being associated with a settlement flag value indicating whether the user has paid for the corresponding item or the corresponding item is associated with a previously sent suspension request,
transmit any piece of commodity identification information stored in correlation with the user identification information to an external device that sends the user identification information to the server device when the settlement flag value associated with the piece of commodity identification information indicates the corresponding item has not yet been paid for, and
execute settlement processing upon a request sent from the external device, the settlement processing using user settlement information stored in association with the user identification information included in the request sent from the external device, the settlement processing handling payment for each item associated with a piece of commodity identification information with the settlement flag value indicating the corresponding item has not yet been paid for that is associated with the user identification information included in the request.

2. The mobile sales system according to claim 1, wherein the external device is another mobile sales device of the mobile sales system.

3. The mobile sales system according to claim 1, wherein the external device is a user terminal device connected to the network.

4. The mobile sales system according to claim 1, wherein the mobile sales device is a mobile robot.

5. The mobile sales system according to claim 1, wherein the mobile sales device includes a camera, and
the user identification information is a facial image of the user acquired via the camera.

6. A mobile sales system, comprising:
a plurality of mobile sales devices;
a server device connectable to the plurality of mobile sales devices through a network, wherein
each mobile sales device includes a first processor configured to:
acquire user identification information from a user at the mobile sales device for a sales transaction,
detect when an item is removed from the mobile sales device and acquire commodity identification corresponding to the removed item,
transmit the user identification information and commodity identification information to the server device,
receive a suspension request for the sales transaction for permitting a delay in payment for the removed item to a later time without return of the removed item, and
send the suspension request to the server device; and
the server device includes a second processor configured to:
store the user identification information and the commodity identification information transmitted from a mobile sales device in correlation with each other, each piece of commodity identification information also being associated with a settlement flag value indicating whether the user has paid for the corresponding item or the corresponding item is associated with a previously sent suspension request,
transmit any piece of commodity identification information stored in correlation with the user identification information to an external device that sends the user identification information to the server device when the settlement flag value associated with the piece of commodity identification information indicates the corresponding item has not yet been paid for, and
execute settlement processing upon a request sent from the external device, the settlement processing using user settlement information stored in association with the user identification information included in the request sent from the external device, the settlement processing handling payment for each item associated with a piece of commodity identification information with the settlement flag value indicating the corresponding item has not yet been paid for that is associated with the user identification information included in the request.

7. The mobile sales system according to claim 1, wherein the first processor is further configured to cause a display screen to display a transaction suspension button for receiving the suspension request for the sales transaction.

8. The mobile sales system according to claim 6, wherein the external device is another mobile sales device in the plurality of mobile sales devices.

9. The mobile sales system according to claim 6, wherein the external device is a user terminal device connected to the network.

10. The mobile sales system according to claim 6, wherein the mobile sales device is a mobile robot.

11. The mobile sales system according to claim 6, wherein
each mobile sales device includes a camera, and
the user identification information is a facial image of the user acquired via the camera.

12. The mobile sales system according to claim 6, wherein the first processor of each mobile sales device is further configured to cause a display screen to display a transaction suspension button for receiving the suspension request for the sales transaction.

13. A server device for a mobile sales system, the server device comprising:
a network communication interface connectable to a mobile sales device; and
a processor configured to:
store user identification information and commodity identification information transmitted from the mobile sales device in correlation with each other, each piece of commodity identification information also being associated with a settlement flag value indicating whether the user has paid for the corresponding item or the corresponding item is associated with a previously sent suspension request for a sales transaction permitting a delay in payment for an item removed from the mobile sales device to a later time without return of the removed item,
transmit any piece of commodity identification information stored in correlation with the user identification information to an external device that sends the user identification information to the server device when the settlement flag value associated with the piece of commodity identification information indicates the corresponding item has not yet been paid for, and
execute settlement processing upon a request sent from the external device, the settlement processing using user settlement information stored in association with the user identification information included in the request sent from the external device, the settlement processing handling payment for each item associated with a piece of commodity identification information with the settlement flag value indicating the corresponding item has not yet been paid for that is associated with the user identification information included in the request.

14. The server device according to claim 13, wherein the external device is a mobile sales device in the mobile sales system.

15. The server device according to claim 13, wherein the external device is a user terminal device connected to the network communication interface.

16. The server device according to claim 13, wherein the mobile sales device is a mobile robot.

17. The server device according to claim 13, wherein
the mobile sales device includes a camera, and
the user identification information is a facial image of the user acquired via the camera.

18. The server device according to claim 13, wherein the suspension request is received after a user at the mobile sales device presses a transaction suspension button on the mobile sales devices.

\* \* \* \* \*